(12) United States Patent
Kanetake et al.

(10) Patent No.: US 9,736,460 B2
(45) Date of Patent: Aug. 15, 2017

(54) DISTANCE MEASURING APPARATUS AND DISTANCE MEASURING METHOD

(71) Applicant: FUJITSU LIMITED, Kawasaki-shi, Kanagawa (JP)

(72) Inventors: Jun Kanetake, Kawasaki (JP); Osafumi Nakayama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 704 days.

(21) Appl. No.: 14/291,188

(22) Filed: May 30, 2014

(65) Prior Publication Data

US 2014/0362193 A1 Dec. 11, 2014

(30) Foreign Application Priority Data

Jun. 11, 2013 (JP) .................................. 2013-122315

(51) Int. Cl.
*H04N 13/02* (2006.01)
*G01S 1/00* (2006.01)
(Continued)

(52) U.S. Cl.
CPC .......... *H04N 13/0221* (2013.01); *G01S 1/00* (2013.01); *G01S 5/16* (2013.01); *G01S 11/12* (2013.01);
(Continued)

(58) Field of Classification Search
CPC ........ H04N 13/0221; H04N 2013/0081; G06T 7/579; G06T 2207/30252; G01S 5/16; G01S 11/12; G01S 1/00
See application file for complete search history.

(56) References Cited

U.S. PATENT DOCUMENTS

| 2003/0088361 A1* | 5/2003 | Sekiguchi | G01S 11/12 |
| | | | 701/301 |
| 2009/0189783 A1* | 7/2009 | Koitabashi | G01S 11/12 |
| | | | 340/937 |

(Continued)

FOREIGN PATENT DOCUMENTS

| JP | 2007-172501 | 7/2007 |
| JP | 2007-256029 | 10/2007 |

(Continued)

OTHER PUBLICATIONS

JPOA—Japanese Office Action mailed on Dec. 27, 2016 for corresponding Japanese Application No. 2013-122315 with full machine translation.

(Continued)

*Primary Examiner* — Sath V Perungavoor
*Assistant Examiner* — Howard D Brown, Jr.
(74) *Attorney, Agent, or Firm* — Fujitsu Patent Center

(57) ABSTRACT

A processor of a distance measuring apparatus calculates a three-dimensional position of an object in the surroundings based on the first image, the second image and the amount of movement. The processor determines that calculated three-dimensional position is an error, when the displacement between a fourth position at which a third position set based on the calculated three-dimensional position of the object is projected on either one image of the first image and the second image and a position of the object in the one image is equal to or larger than a prescribed value. The processor makes the calculated three-dimensional position a distance measurement target when the calculated three-dimensional position is not determined as an error, and when determined as an error, excludes the calculated three-dimensional position from the distance measurement target.

15 Claims, 37 Drawing Sheets

(51) Int. Cl.
  *G01S 5/16* (2006.01)
  *G01S 11/12* (2006.01)
  *G06T 7/579* (2017.01)
  *H04N 13/00* (2006.01)
(52) U.S. Cl.
  CPC .... *G06T 7/579* (2017.01); *G06T 2207/30252* (2013.01); *H04N 2013/0081* (2013.01)

(56) References Cited

U.S. PATENT DOCUMENTS

| 2012/0170812 A1* | 7/2012 | Kamiyama | B60R 1/00 382/103 |
| 2013/0141581 A1* | 6/2013 | Mitsuta | B60R 1/00 348/148 |

FOREIGN PATENT DOCUMENTS

| JP | 2009-180536 | 8/2009 |
| JP | 2009-294842 | 12/2009 |

OTHER PUBLICATIONS

Sato et al., "Restoration of the camera move parameter from the video by pursuit of a marker and the natural focus", Journal of the Institute of Electronics, Information and Communication Engineers D-II, Japan, General incorporated foundation Institute of Electronics, Information and Communication Engineers, Oct. 1, 2003, vol. J86-D-II and No. 10, and pp. 1431-1440.

\* cited by examiner

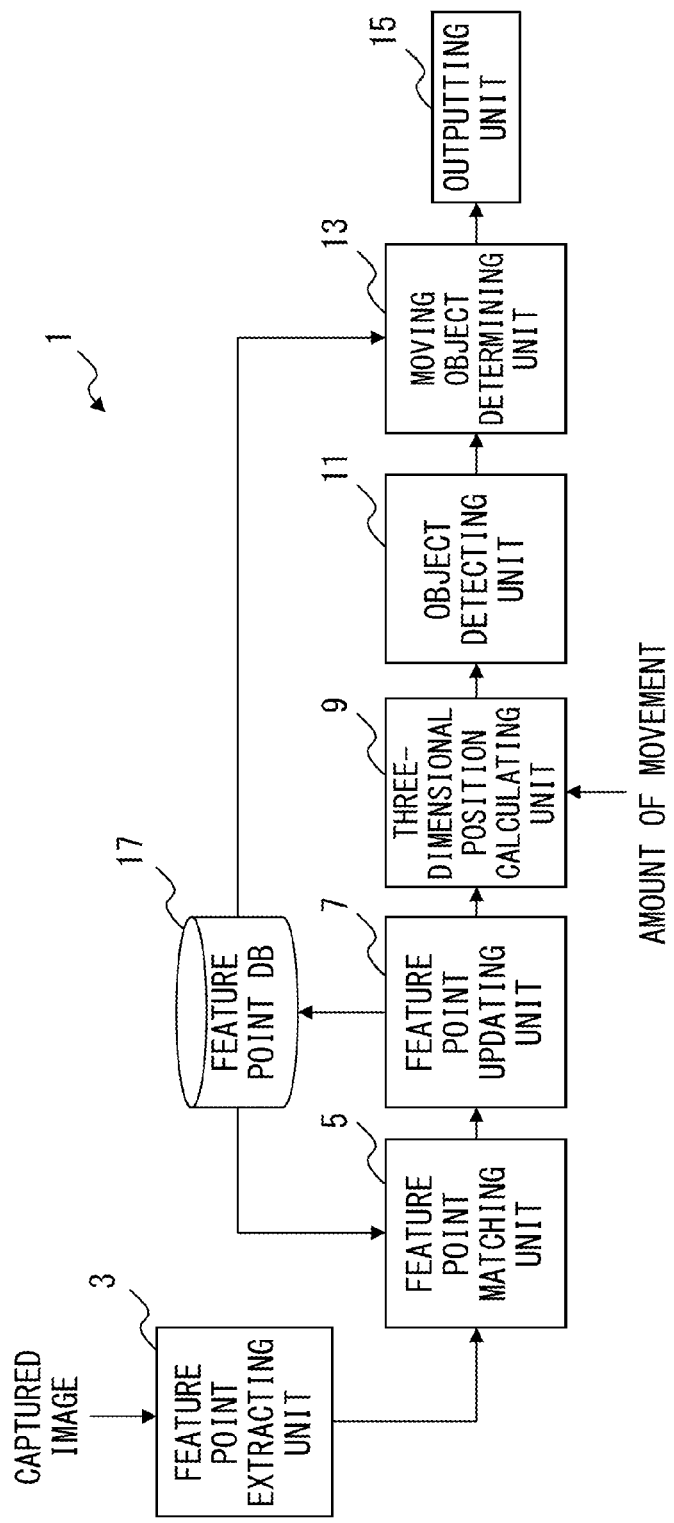
F I G. 1

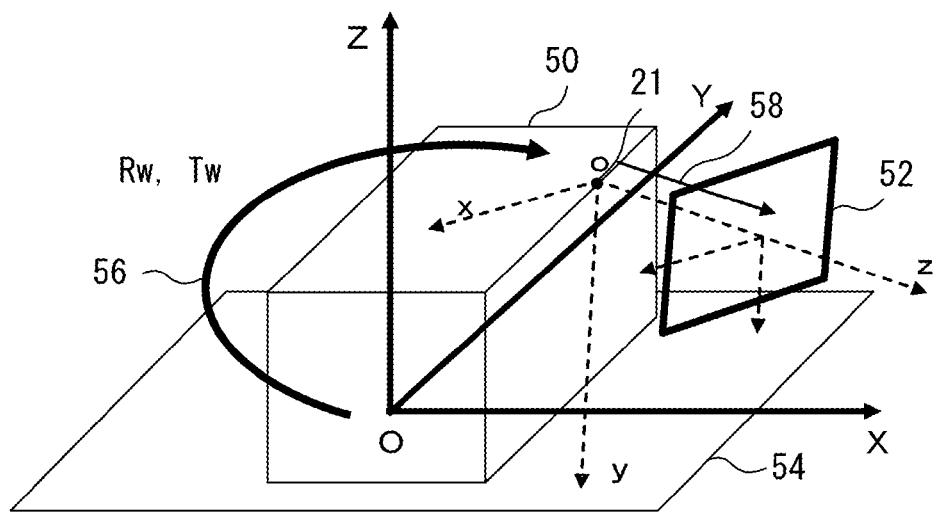
F I G. 3

FIG. 13

| INFORMATION | VARIABLE |
|---|---|
| FEATURE POINT POSITION | rx,ry |
| PATTERN INFORMATION | vr(b·a) |

156

| INFORMATION | VARIABLE |
|---|---|
| THREE-DIMENSIONAL POSITION | X,Y,Z |
| OBJECT NUMBER | no |
| PROJECTED IMAGE LOWER POSITION | x0,y0 |
| PROJECTED IMAGE UPPER POSITION | x1,y1 |

FIG. 16

| INFORMATION | VARIABLE |
|---|---|
| CONNECTION DESTINATION | jump2 |

162

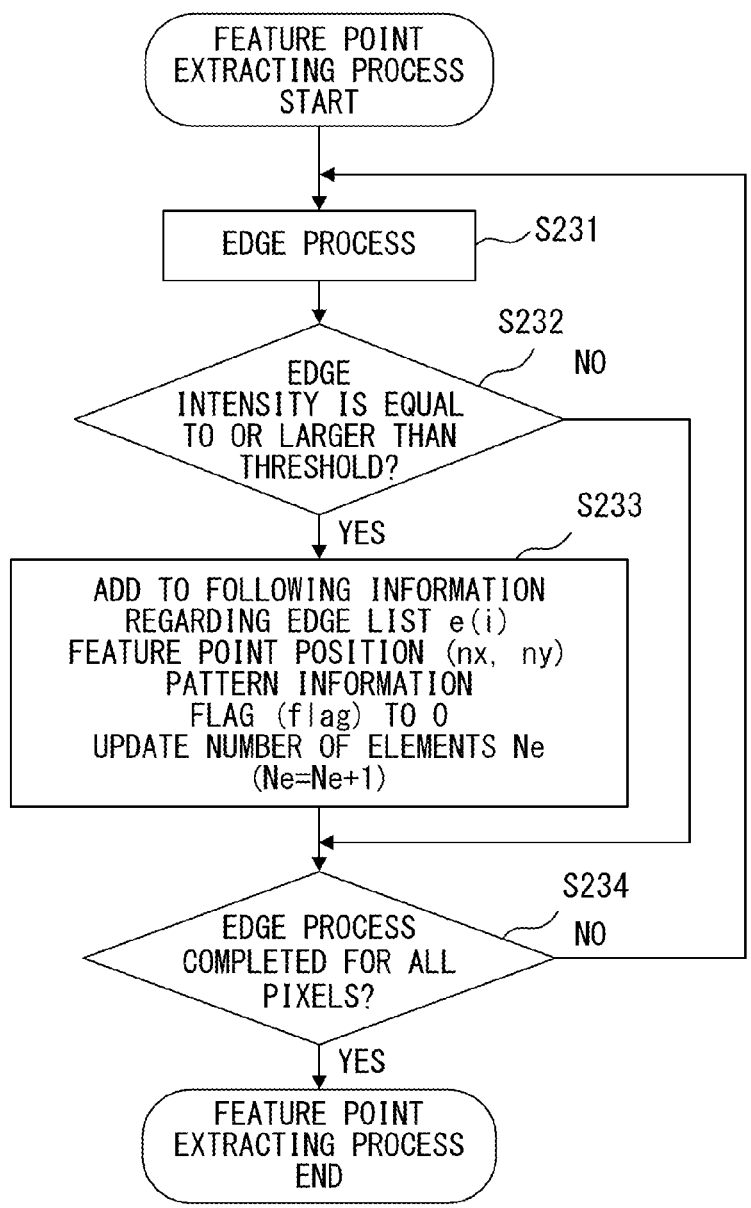
F I G. 2 3

DISTANCE MEASURING APPARATUS AND DISTANCE MEASURING METHOD

CROSS-REFERENCE TO RELATED APPLICATION

This application is based upon and claims the benefit of priority of the prior Japanese Patent Application No. 2013-122315, filed on Jun. 11, 2013, the entire contents of which are incorporated herein by reference.

FIELD

The embodiments discussed herein, are related to a distance measuring apparatus and a distance measuring method.

BACKGROUND

A technique in measuring the three-dimensional position of an object in the surroundings using images captured at different times while traveling in which an image capturing is provided in a moving body such as a vehicle has been known. In an example of apparatuses that measure the three-dimensional position, a large number of feature points determined as displayed in common in two images whose image capturing times are different are extracted, and they are associated with each other, to estimate the corresponding points between the images. In addition, a tentative vehicle momentum of the vehicle is calculated, a tentative basic matrix is calculated and estimated, and from the tentative basic matrix, the epipole error is calculated regarding each of the larger number of extracted corresponding points. Accordingly, from the larger number of extracted corresponding points, the corresponding point with a large error value is eliminated as a wrong corresponding point. Furthermore, based on the larger number of extracted corresponding points from which the wrong corresponding points have been eliminated, a basic matrix is estimated, and from the estimated basic matrix, the vehicle momentum of the vehicle is calculated and estimated. Then, using the estimated vehicle momentum of the vehicle and the corresponding points from which the wrong corresponding points have been eliminated, the three-dimensional coordinates of the feature point are estimated (see, for example, Patent document 1).

Patent Document 1: Japanese Laid Open Patent Publication No. 2007-256029

SUMMARY

According to an aspect of the invention, a processor of a distance measuring apparatus receives a first image captured by an image capturing apparatus of a vehicle at a first position and a second image captured at a second position that is different from the first position. The processor receives an amount of movement of the vehicle between the first position and the second position from an amount of movement detecting apparatus placed in the vehicle, and calculates a three-dimensional position of an object in the surroundings based on the first image, the second image and the amount of movement. Further, the processor compares a displacement between a fourth position at which a third position is set based on the calculated three-dimensional position of the object is projected on either one image of the first image and the second image and a position of the object in the one image with a prescribed value. When the displacement is equal to or larger than the prescribed value, the processor determines that the calculated three-dimensional position is an error, and when the calculated three-dimensional position is not determined as an error, makes the calculated three-dimensional position a distance measurement target and when determined as an error, excludes the calculated three-dimensional position from the distance measurement target.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is a block diagram illustrating an example of the functional configuration of a distance measuring apparatus according to an embodiment.

FIG. 3 is a diagram illustrating the relationship of the coordinate system in a case in which a vehicle is traveling on a road surface as a moving body.

FIG. 13 is a diagram illustrating an example of registration list.

FIG. 16 is a diagram illustrating an example of a final connection destination list.

FIG. 23 is a flowchart illustrating a feature point extracting process.

DESCRIPTION OF EMBODIMENTS

When the measurement target is a stationary object, as for the conventional apparatus that measures the three-dimensional position, by eliminating the points with a large epipole error using the epipolar constraint being established, the feature point matching between two times may be performed. However, when the distance measurement target is a moving object, there is a case in which the epipolar constraint is not established, and in this case, the image positions of the feature points in images captured at different times do not exist on the epipolar line. As a result, the feature point matching fails, and the three-dimensional position is not output.

However, there is a problem that, depending on the moving direction of the moving object, there is a special case in which the feature point image positions seen after the movement exist on the epipolar line, leading to a successful feature point matching, and furthermore, different positions from the actual distance are calculated, causing an erroneous detection.

Preferred embodiments of the present invention will be explained with reference to accompanying drawings. A distance measuring apparatus 1 is an apparatus that provides assistance at the time of parking by outputting information regarding an object existing within a prescribed distance, by a motion stereo method to capture the images of the surroundings from different positions and measure the distance to the object.

Figure 2:
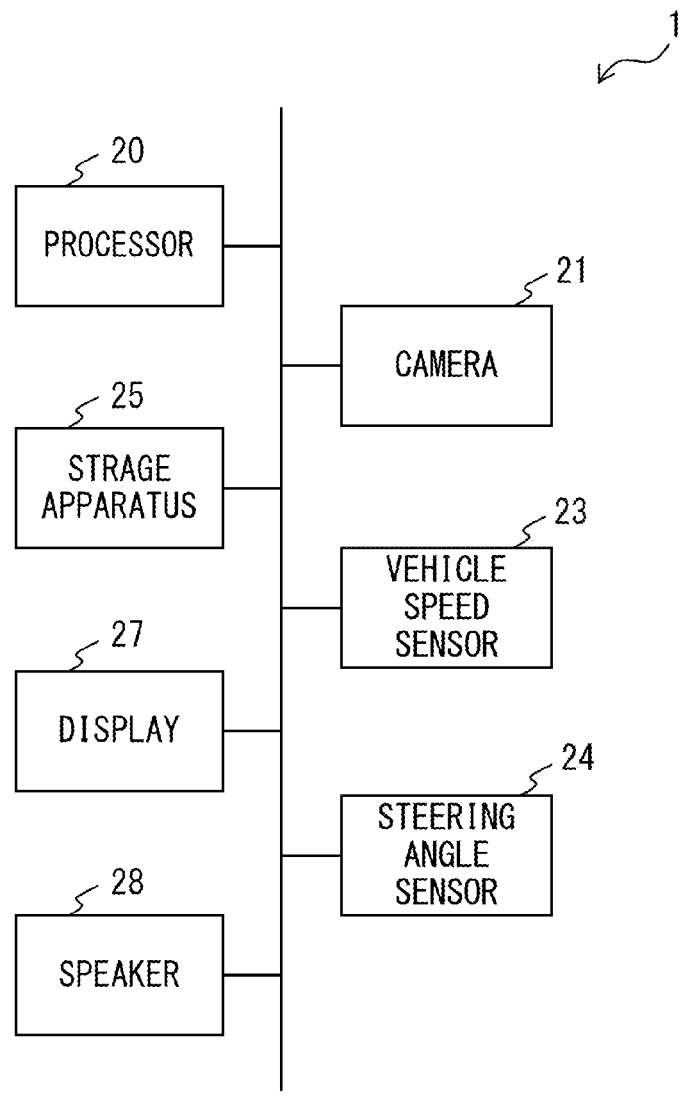
FIG. 2 is a block diagram illustrating an example of the hardware configuration of a distance measuring apparatus according to an embodiment.

FIG. 1 is a block diagram illustrating an example of the functional configuration of the distance measuring apparatus 1 according to an embodiment. FIG. 2 is a block diagram illustrating an example of the hardware configuration of the distance measuring apparatus 1. As illustrated in FIG. 1, the distance measuring apparatus 1 includes the functions of a feature point extracting unit 3, a feature point matching unit 5, a feature point updating unit 7, a three-dimensional position calculating unit 9, an object detecting unit 11, moving object determining unit 13, an outputting unit 15, feature point Database (DB).

The functions of the distance measuring apparatus illustrated in FIG. 1 are realized by the hardware configuration illustrated in FIG. 2. The distance measuring apparatus 1 includes a processor 20, a camera 21, a vehicle speed sensor 23, a steering angle sensor 24, a storage apparatus 25, a display 27, a speaker 28 and the like. The respective functions of the distance measuring apparatus 1 illustrated in FIG. 1 is realized by, for example, the reading in a program stored in the storage apparatus 25 and executing it by the processor 20. In addition, a part of the distance measuring apparatus 1 for example may be realized by an integrated circuit and the like using a semiconductor.

The processor 20 is a processor that performs calculation processes such as the operation control of the distance measuring apparatus 1. The camera 21 is a monocular image capturing apparatus fixed on a vehicle for example. The vehicle speed sensor 23 is a detecting apparatus that detects the speed of a vehicle. The steering angle sensor 24 is a detecting apparatus that detects the change in the traveling direction by detecting the steering wheel operation angle. The storage apparatus 25 is a memory and the like readable/writable as needed. The storage apparatus 25 may store a program to control the operation of the distance measuring apparatus 1 and the feature point DB 17. In addition, it may tentatively store information in the processes performed in the distance measuring apparatus 1.

The display 27 is a display apparatus such as a liquid-crystal display apparatus for example, and displays an image and the like processed based on the calculated three-dimensional distance. The speaker 28 is, for example, is a sound output apparatus that generates sounds based on the calculated three-dimensional distance.

Returning to FIG. 1, the feature point extracting unit 3 extracts feature points from the image captured by the camera 21. The feature point matching unit 5 matches feature points determined as existing in common in images captured from different positions from each other at the first time and the second time after the movement of the vehicle. The feature point DB 17 is, for example, a database storing information regarding the image immediately preceding the current image. The feature point DB 17 may also hold information regarding several images in the past.

The feature point updating unit 7 updates the feature point DB 17 to information of the latest image, for example. Meanwhile, when the feature point DB 17 holds information regarding several images, the feature point updating unit 7 may delete information of the oldest image and add the latest information. The three-dimensional position calculating unit 9 calculates the three-dimensional position of the object corresponding to the common feature points, based on the common feature points matched in the feature point matching unit 5 and the amount of movement of the vehicle from the first time to the second time obtained from the vehicle speed sensor 23, the steering angle sensor 24 for example.

The object detecting unit 11 detects an object by determining the three-dimensional positions calculated by the three-dimensional position calculating unit 9 that exist in a smaller distance range from each other than a prescribed distance as the three-dimensional position of an identical object. A process such as to project the three-dimensional position of the detected same object on the road surface for example is performed, and re-projection is performed on the image captured by the camera 21, and whether the positional displacement from the object captured on the image is within a prescription is determined. When the positional displacement is within the prescription, the moving object determining unit 13 determines that the target object is a stationary object and that the detection is not wrong, and when it is equal to or above the prescription, determines that it is a wrong detection. The outputting unit 15 deletes the three-dimensional position determined as a wrong detection from the calculation result, and outputs only the three-dimensional position that has been determined as not being a wrong description.

Meanwhile, details of the above configuration and operation are described later. Here, first, a general explanation is made regarding the distance measuring method in the distance measuring apparatus 1 according to the present embodiment. FIG. 3 is a diagram illustrating the relationship of the coordinate systems in a case in which a vehicle 50 is traveling on a road surface 54 as a moving body.

As illustrated in FIG. 3, in the distance measuring method of the present embodiment, a case in which the camera 21 is fixed on the vehicle 50, and the vehicle 50 travels on the road surface 54 is explained as an example. At this time, assuming the intersection point of a perpendicular line from a certain point of the vehicle 50 to the road surface 54 as the origin O, an orthogonal coordinate system O-XYZ having the Z axis in the direction perpendicular to the road surface 54 and the Y axis in the direction parallel to the traveling direction of the vehicle 50 is referred to as a moving body coordinate system. The certain point of the vehicle 50 may be, for example, the center of gravity of the vehicle 50, the center of the cross section parallel to the road surface 54, and the like.

Meanwhile, assuming the camera position of the camera 21 provided in the vehicle 50 (for example, the center point of the objective lens of the camera 21: hereinafter, simply referred to as the camera position) as the origin o, an orthogonal coordinate system o-xyz with the optical axis as the z axis is referred to as a camera coordinate system. At this time, in the camera coordinate system, a plane that is perpendicular to the z axis and is away from the camera position by the focal distance f of the camera as an arrow 58 is assumed as an image capturing plane 52. An arrow 56 represents the transformation between the moving body coordinate system and the camera coordinate system, and its details are described later. Meanwhile, the definition of each of the coordinate systems above is an example, and this is not a limitation.

Figure 4:
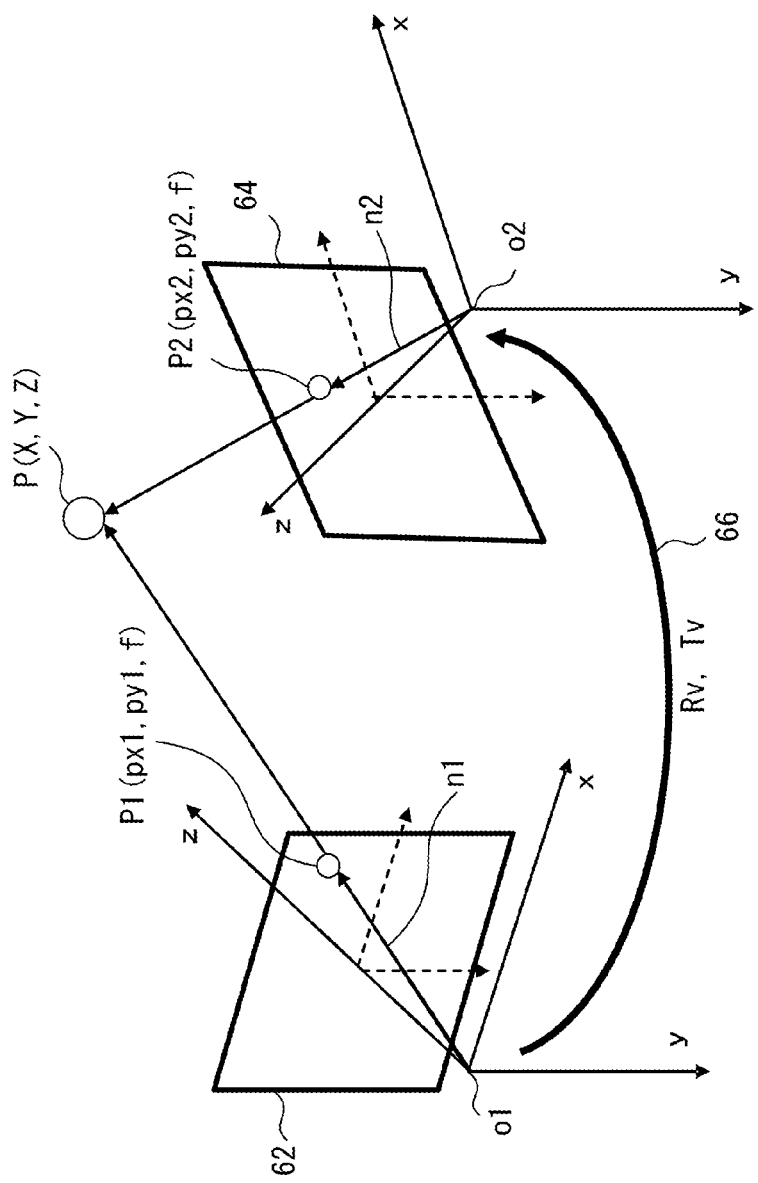
FIG. 4 is a diagram conceptually illustrating the image capturing situation while a vehicle is moving.

FIG. 4 is a diagram conceptually illustrating an image capturing situation while the vehicle 50 is moving. As illustrated in FIG. 4, it is assumed that a first camera coordinate system in which the camera position at a time t1 is an origin o1 is a coordinate system o1-xyz, and a second camera coordinate system in which the camera position at a time t2 is an origin o2 is a coordinate system o2-xyz. An arrow 66 represents the movement of the vehicle 50 between the time t1 and the time t2, and the transformation between the first camera coordinate system and the second camera coordinate system, and its details are described later. In addition, an image capturing plane 62 is the image capturing plane at the time t1, and the image capturing plane 64 is the image capturing plane at the time t2.

As illustrated in FIG. 4, at the time t1, in the first camera coordinate system, a feature point P1(px1, py1, f) is extracted. Meanwhile, at the time t2, in the second camera coordinate system, a feature point P2(px2, py2, f) is extracted. FIG. 4 conceptually illustrate that these feature points are a point P (X, Y, Z) (the moving body coordinate system) of an identical object by the matching process described later.

Figure 5:
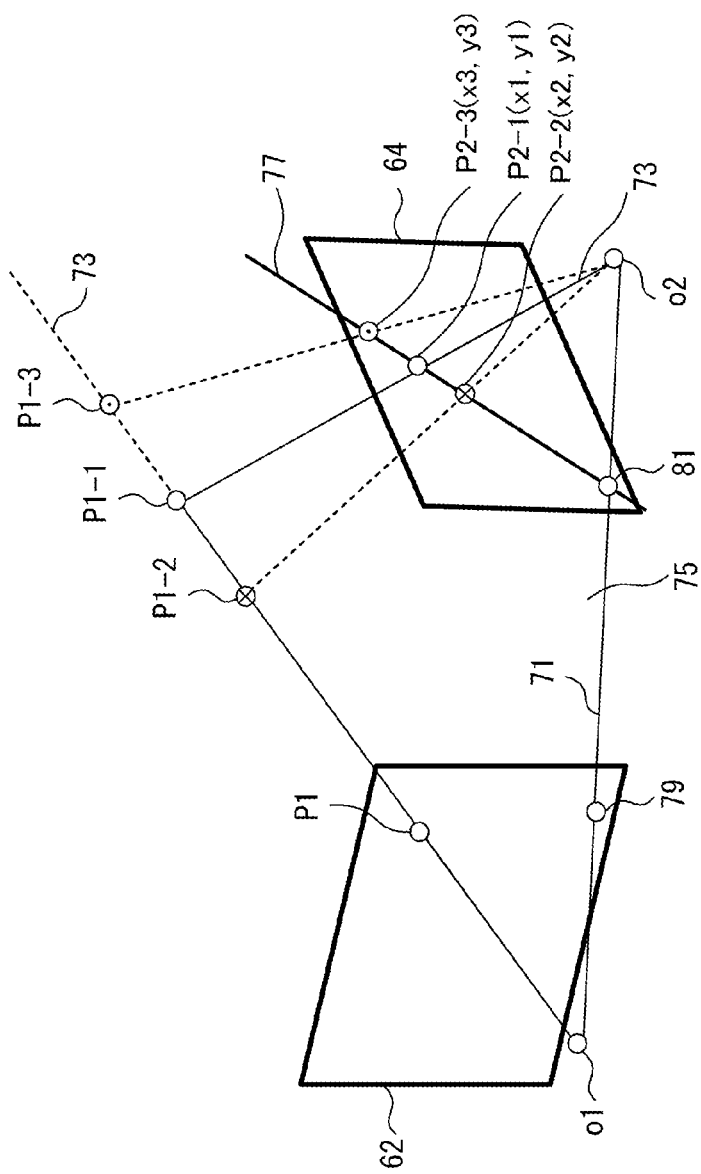
FIG. 5 is a diagram illustrating an example of the positional relationship between the camera position and the feature point.

FIG. 5 is a diagram illustrating an example of the positional relationship of the camera position and the feature point. As illustrated in FIG. 5, it is assumed that the three-dimensional position of the camera 21 at the time t1 and the three-dimensional position of the camera 21 at the time t2 in the moving body coordinate system are known, and the object of the measurement target (hereinafter, the target object) is a stationary object. In this case, the position of the object feature point on the image capturing plane 64 at the time t2 exists on an epipolar line 77. The epipolar line 77 is the line of intersections between a plane (epipolar plane) including a straight line 73 connecting the camera positions (the origins o1, o2) at the time t1, the time t2, and the feature point P1, and the image capturing plane 64 at the time t2. Here, an epipolar point 79 and an epipolar point 81 on the epipolar plane are presented.

The object feature point existing on the straight line 73 is known to be exist, on the image capturing plane 64 of the time t2 somewhere on the epipolar line 77. This characteristic is referred to as the epipolar constraint, In the present embodiment, when calculating the three-dimensional position of a stationary object by the motion stereo method to calculate the three-dimensional position, the epipolar constraint is established.

Figure 6:
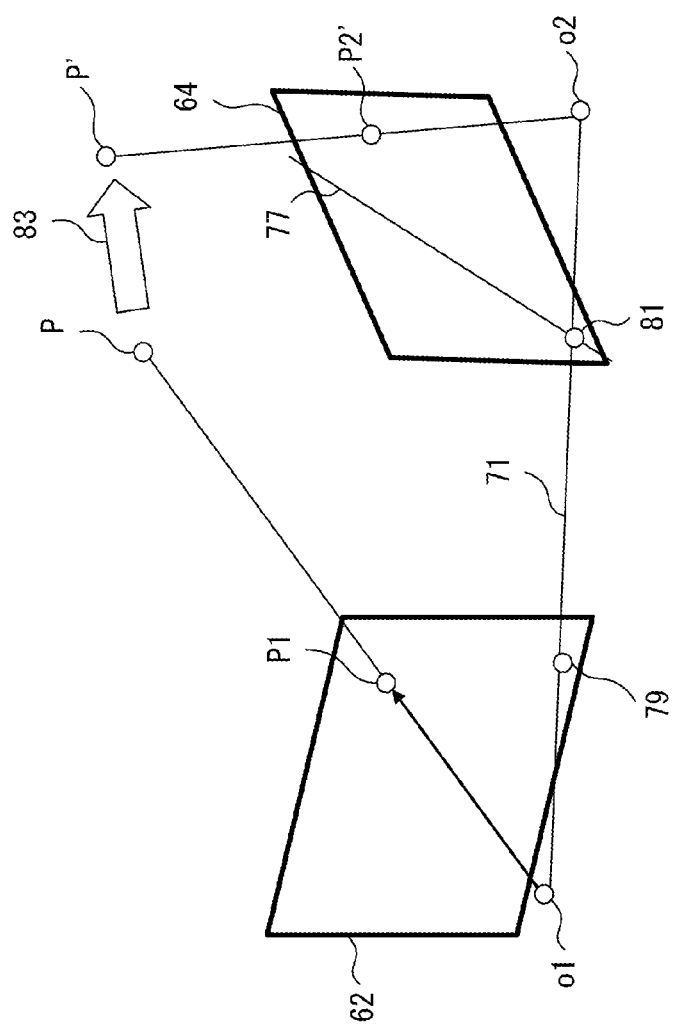
FIG. 6 is a diagram conceptually illustrating a measurement example in a case without epipolar constraint.

FIG. 6 is a diagram conceptually illustrating a measurement example in a case without epipolar constraint. As illustrated in FIG. 6, the target object that was on a point P at the time t1 has moved to a point P' that is not on the epipolar plane mentioned above, for example, as an arrow 83. At this time, on the image capturing plane 64 captured at the time t2, the target object is on the position of a point P2', and does not exist on the epipolar line 77. By searching the feature point on the epipolar line at the time of the feature point matching of two times using the characteristic described above, the feature point matching is performed with a good accuracy as well as a good efficiency.

However, depending on the moving direction of the target object, there is a special case in which the feature point image positions seen at the time t2 exist on the epipolar line, leading to a successful feature point matching. As an example of the special case, a case in which the moving direction is parallel to the traveling direction of the vehicle 50 is explained below. Meanwhile, the special case mentioned above is a special example in which the target object is a moving object, hereinafter, the explanation is made assuming the special case as "a moving object", and the case in which the three-dimensional position calculation is possible as "a stationary object".

Figure 7:
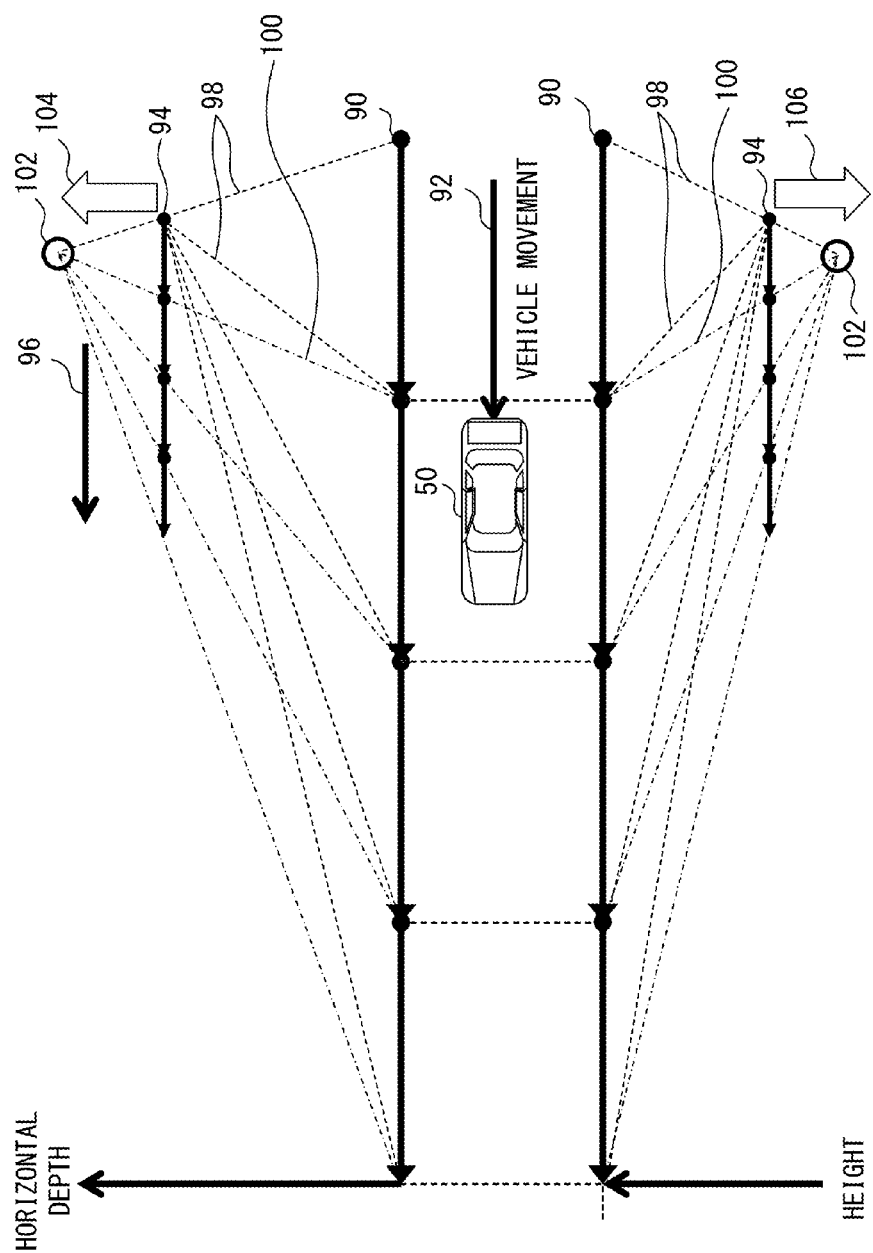
FIG. 7 is a diagram conceptually illustrating a case in which the moving direction of a target object is the parallel and same direction with the moving direction of a vehicle.

FIG. 7 is a diagram conceptually illustrating a case in which the moving direction of the target object is the parallel and same direction with the moving direction of the vehicle 50. As illustrated in FIG. 7, when a camera position 90 moves in the direction of a vehicle moving direction 92 and an object position 94 does not change, the target object is observed in the direction indicated by a straight line 98. On the other hand, when the target object moves in a moving direction 96, the target object is observed in the observation direction indicated by a straight line 100. Therefore, the position of the target object is calculated as at the calculated position 102, and as indicated by an arrow 104, calculated as positioned farther in the horizontal direction than the actual position. In a similar manner, as illustrated by an arrow 106, the calculated position 102 is calculated as the calculated position 102 on a lower side in the vertical direction.

As in the example in FIG. 7, when the vehicle 50 and the target object are moving in the same direction, there is no contradiction in regarding as a stationary object existing farther than the actual position as the geometric positional relationship. However, the height is on a lower side (below the road surface) than the actual position, the calculated three-dimensional position may be eliminated as that for a moving object.

Figure 8:
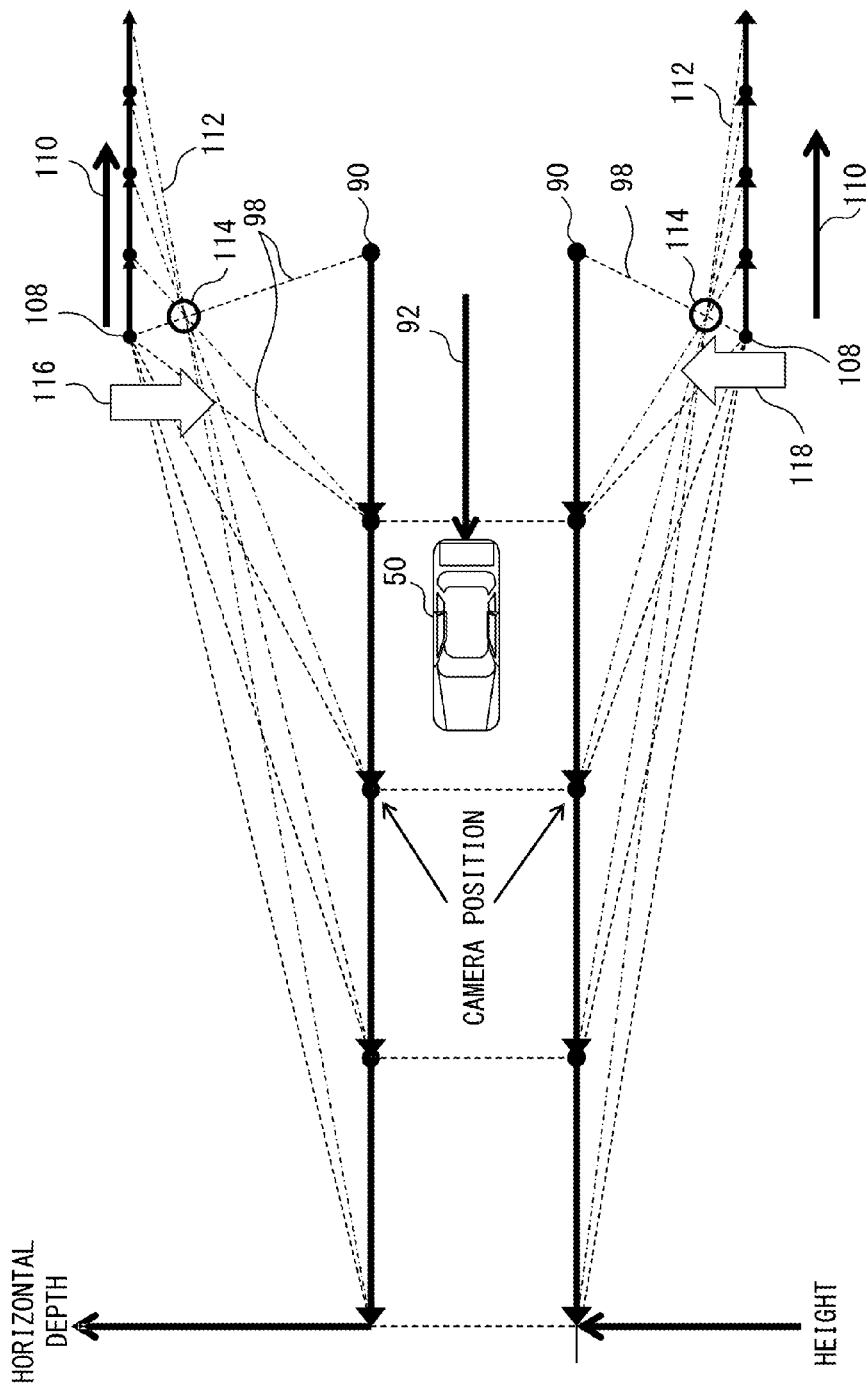
FIG. 8 is a diagram conceptually illustrating a case in which the moving direction of a target object is the parallel and opposite direction with the moving direction of a vehicle.

FIG. 8 is a diagram conceptually illustrating a case in which the moving direction of the target object is the parallel and opposite direction with the moving direction of the vehicle 50. As illustrated in FIG. 8, when the camera position 90 moves in the direction of a vehicle moving direction 92 and an object position 108 does not change, the target object is observed in the direction indicated by a straight line 98. When the target object is moving in a moving direction 110, the target object is observed in the observation direction indicated by a straight line 112. Therefore, the position of the target object is calculated as a calculated position 114, and as indicated by an arrow 116, calculated as positioned more forward than the actual position in the horizontal direction with respect to the position of the vehicle 50. In a similar manner, as indicated by an arrow 108, the calculated position 114 is calculated as at the calculated position 114 on an upper side in the vertical direction. As in the example of FIG. 8, when the vehicle 50 and the target object are moving in opposite directions, it follows that there is no contradiction in regarding as a stationary object floating closer than the actual position as the geometric positional relationship.

Figure 9:
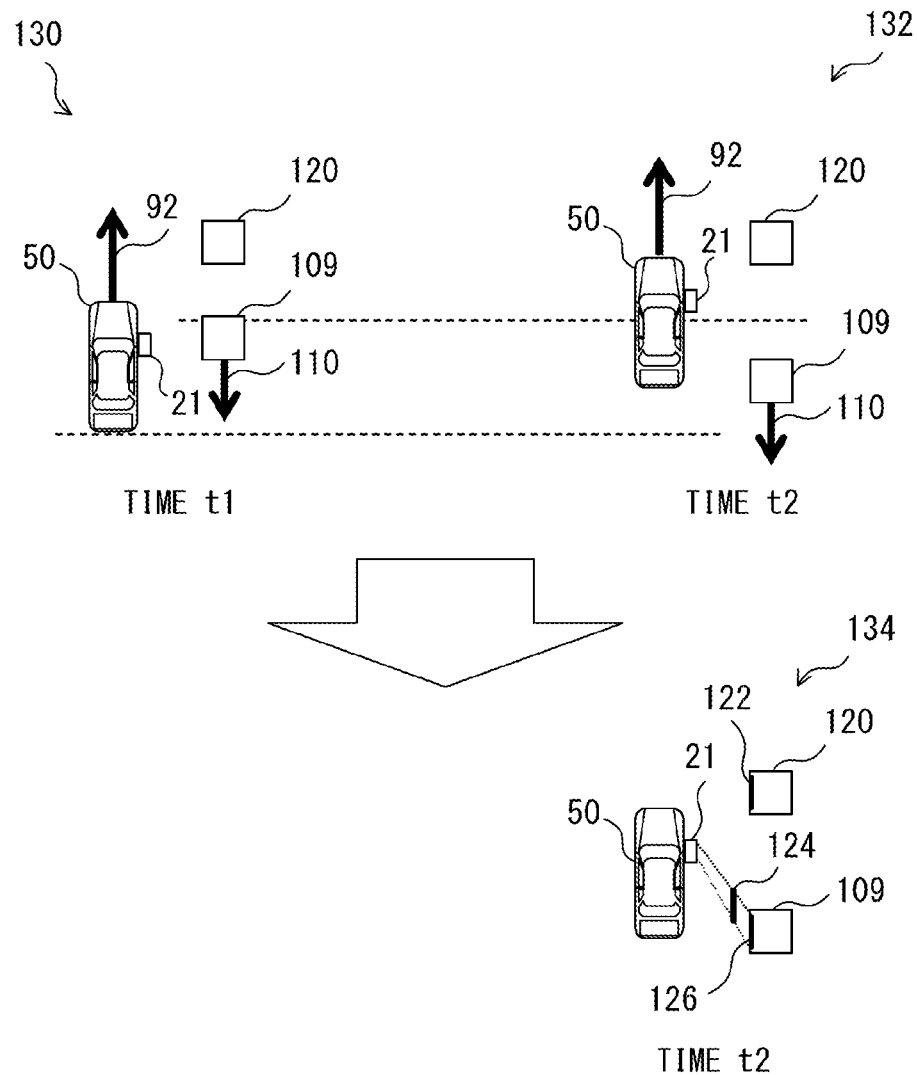
FIG. 9 is a diagram conceptually illustrating the distance measurement of a stationary object and a moving object by a distance measuring apparatus.

FIG. 9 is a diagram conceptually illustrating the distance measurement of a stationary object and a moving object by the distance measuring apparatus 1. As illustrated in FIG. 9, in an image capturing situation 130 at the time t1, it is assumed that a stationary object 120 and a moving object 109 moving in the direction of an arrow 110 that is opposite to the moving direction of the vehicle exist in the surroundings of the vehicle 50. In an image capturing situation 132 at the time t2, it is assumed that the stationary object 120 and the moving object 109 moving in the direction of the arrow 110 exist. Based on the images captured at the respective times, the three-dimensional position calculating unit 9 according to the present embodiment calculates the three-dimensional position. At this time, as illustrated in a calculation example 134, regarding the stationary object 120, the position at which the three-dimensional position of the lower end of the object is projected on the road surface is, for example, a road surface position 122, and corresponds with the stationary object 120. However, regarding the moving object 109, as the position at which the three-dimensional position of the lower end of the object is projected on the road surface, for example, a road surface position 124 is calculated. That is, a position closer to the vehicle 50 than the actual position is calculated, which does not correspond with the actual position of the moving object 109.

Figure 10:
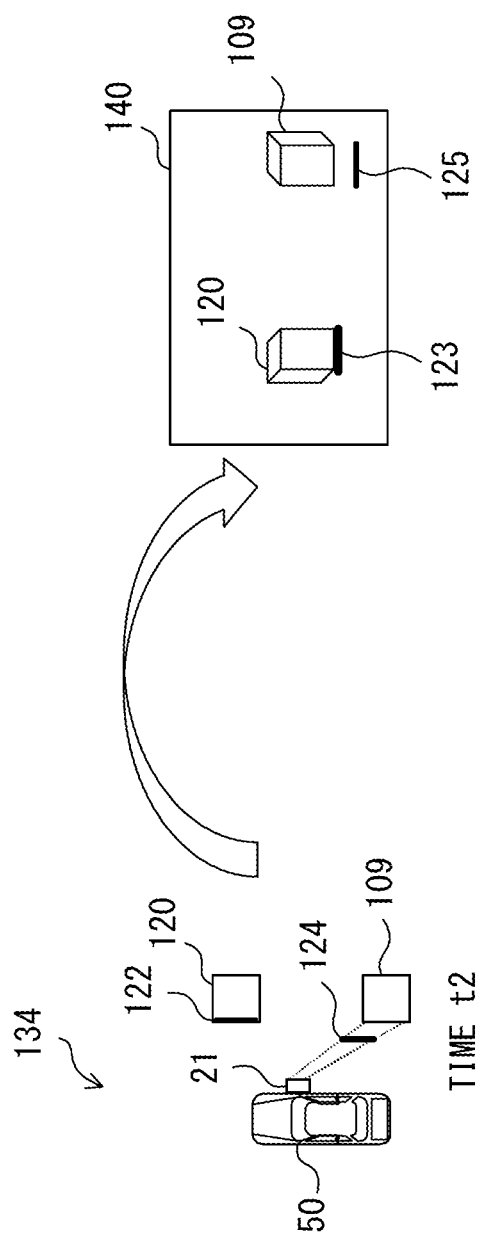
FIG. 10 is a diagram conceptually illustrating a case in which a three-dimensional position calculation example is re-projected on a captured image.

FIG. 10 is a diagram conceptually illustrating a case in which the calculation example 134 is re-projected on a captured image. As illustrated in FIG. 10, when the calculation example 134 is re-projected on an image 140 captured at the time t2, regarding the stationary object 120, the road surface position 122 is projected on a re-projection position 123, and corresponds with the lower end position of the stationary object 120. However, regarding the moving object 109, the road surface position 124 is projected on a re-projection position 125, and does not correspond with the actual moving object 109.

Figure 11:
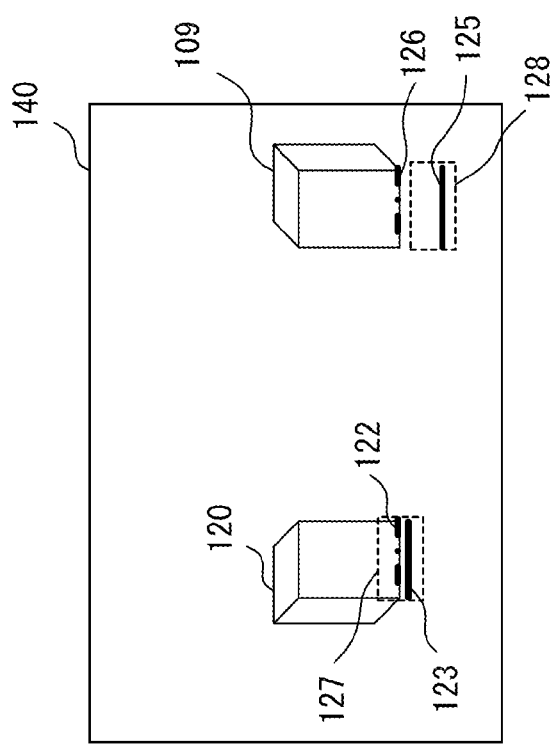
FIG. 11 is a diagram conceptually explaining a judgment method of a moving object.

FIG. 11 is a diagram conceptually illustrating a judgment method of a moving object. As illustrated in FIG. 11, the re-projection position 123 on an image 140 is a position calculated in correspondence with the three-dimensional position of the stationary object 120, and a search range 127 is a range calculated based on the re-projection position 123. In a similar manner, for a moving object 109, a re-projection position 125, and a search 128 are presented. The calculation example of the search ranges 127, 128 are described later.

In the stationary object 120, the lower end of the stationary object 120 on the image 140 exist in the search range 127 calculated based on the re-projection position 123. On the other hand, in the moving object 109, a lower end 126 of the moving object 109 is out of the calculated search range 128.

As described above, the difference between the calculated the three-dimensional position and the actual three-dimensional position is determined by the difference between the position on which the lower end position of the object projected on the road surface 54 is re-projected on the image 140 and the lower end position of the object in the image 140, to prevent a wrong three-dimensional position from being output.

Figure 12:
FIG. 12 is a diagram illustrating an example of an edge list.

Hereinafter, the distance measuring apparatus 1 is explained in greater detail. First, referring to FIG. 12, the feature point extracting unit 3 is explained. FIG. 12 is a diagram illustrating an example of an edge list 154. The edge list 154 is information generated by a process by the feature point extracting unit 3. Hereinafter, for the lists indicating the respective pieces of information such as the edge list 154, the registration list 156 and the like, an element of each list is illustrated, unless otherwise stated. Each list may be a set of the illustrated element.

The feature point extracting unit 3 detects a feature point (edge point) group from the image captured by the camera 21 attached to the vehicle 50. Meanwhile, conversion from a color video to a monochromatic gradation image, distortion correction for the captured image and the like are performed as needed. The feature point is a place in the image at which the brightness rapidly changes, and for the extraction of the feature point, a general filtering process such as a Sobel filter may be used. When the value (edge intensity) of each point (pixel) after the application of the filter is equal to or larger than a threshold, the feature point extracting unit 3 extracts it as a feature point.

The feature point extracting unit 3 calculates the edge intensity of each pixel of the target image, and when there is a place at which the edge intensity is equal to or larger than a threshold, registers the current feature point position, the surrounding pattern information described later in the edge list 154.

As illustrated in FIG. 12, the edge list 154 is information regarding feature points e(s1) extracted in an image obtained at a certain time. Here, the variable s1 is an integer 1-Ne. The number of elements Ne is an integer representing the number of feature points extracted in the obtained image, and is also referred to as the number of elements of the feature point. The edge list 154 includes the current feature point position, the past feature point position, the pattern information, the matching process flag. The current feature point position is a position of the feature point extracted from the image captured at the time t1, for example, and is represented by coordinates (nx, ny) defined on the image. The past feature point position is the coordinates (rx, ry) of the corresponding feature point in the immediately-preceding captured image, for example. The pattern information vn(b·a) represents the pixel values for b pixels in the y axis direction and for a pixels in the x axis direction with the feature point (nx, ny) as the center. The pixel value is, for example, the luminance, the edge intensity and the like. The matching process flag is information stored by the feature point matching unit 5 described later, and indicates whether or not a corresponding feature point has been extracted.

Meanwhile, in the edge list 154 in FIG. 12, only the information corresponding to one feature point e(s1) is illustrated, but similar information may be held in correspondence with each of a plurality of feature points. In addition, the edge list 154 is initialized (the number of elements Ne=0) before the feature point extracting process.

Next, referring to FIG. 13, details of the feature point matching unit 5 is explained. FIG. 13 is a diagram illustrating an example of a registration list 156. The registration list 156 is information regarding a feature point that was already extracted in an image captured in the past, and is stored in the feature point DB 17 for example.

For example, assuming that the edge list 154 is information regarding an image captured at the time t2, the registration list 156 may be the information regarding a feature point r(s2) extracted by the feature point extracting unit 3 in an image captured at the time t1 that is prior to the time t2. Here, the variable s2 is an integer 1–Nr. The number of elements Nr is the number of feature points extracted in the target image, for example, the preceding frame.

When the image captured by the camera 21 is a moving image, the registration list 156 may be the image of the immediately preceding frame of the current one. Hereinafter, the image corresponding to the edge list 154 is referred to as the current frame, and the image corresponding to the registration list 156 is referred to as the preceding frame.

The registration list 156 includes the feature point position and the pattern information. Meanwhile, in the registration list 156, only the information corresponding to one feature point r(s2) is illustrated, but similar information may be held in correspondence with each of a plurality of feature points. The registration list 156 is used in the time series, and therefore, no initialization is performed.

The feature point matching unit 5 performs a matching for the feature point group of the current frame extracted by the feature point extracting unit 3 and the feature point group of the preceding frame for example recorded in the feature point DB 17. At the time of the matching, the feature point matching unit 5 sets, for example, an area of a certain size (for example, a×b pixels including the feature point) with the feature point as the center. The feature point matching unit 5 may apply a general matching process between videos based on the pixel values in the areas of a certain size mentioned above of the feature points. The general matching process is, for example, a process using the absolute value sum of the difference (Sum of Absoluted d Difference: SAD) of the luminance values, the square sum of the difference (Sum of Squared Difference: SSD) of the luminance values of the areas of a certain size, and the like. In addition, the distance between the feature points being within a threshold may also be added to the condition of the matching.

When the feature point matching unit 5 succeeds in the matching between the edge list 154 and the registration list 156, the feature point position(rx, ry) of the element r(s2) of the registration list 156 is registered in the feature point position(rx, ry) of the element e(s1) of the edge list. In addition, the feature point matching unit 5 turns the flag of the element e(s1) to "1" for example, Next, the feature point updating unit 7 is further explained. The feature point updating unit 7 updates the registration list 156 by initializing the registration list 156 and registering the information of the edge list 154 of the feature point group extracted by the feature point extracting unit 3. The feature point updating unit 7 records the updated registration list 156 in the feature point DB 17.

Next, three-dimensional position calculating unit is further explained. The three-dimensional position calculating unit 9 calculates the three-dimensional position corresponding to the feature point from the feature point positions of the two times for which the feature point matching unit 5 succeeded in the matching and the behavior of the vehicle 50 (the amount of movement of the camera 21). The behavior of the vehicle 50 is obtained from the vehicle speed sensor 23, the steering angle sensor 24 and the like. The calculation method of the three-dimensional position is described below.

Regarding the coordinate system, as described above, the moving body coordinate system and the camera coordinate system are defined as in FIG. 3. As indicated by the arrow 56 in FIG. 3, the transformation between the moving body coordinate system and the camera coordinate system is assumed to be expressed by, in the moving body coordinate system, a rotation matrix Rw, a translation vector Tw. The rotation matrix Rw is, for example, a matrix of three rows and three columns expressed using the angles formed by the respective axes of the camera coordinate system with respect to the respective axes of the moving body coordinate system. The translation vector Tw is, for example, a matrix of three rows and one column representing the position of the origin of the camera coordinate system with respect to the origin of the moving body coordinate system.

The amount of movement (Rm, Tm) of the vehicle 50 expressed by the rotation matrix Rm and the translation vector Tm is described in the moving body coordinate system. In addition, the three-dimensional position described in the moving body coordinate system at the time t1 is assumed as a vector Xw1, the three-dimensional position described in the coordinate system of the moving body at the time t2 is assumed as the vector Xw2, and the three-dimensional position describing, the same points, in the camera coordinate system is assumed as the vectors xh1, xh2. Here, it is assumed that the amount of movement of the moving body from the time t1 to the time t2 is expressed by the rotation matrix Rm and the translation vector Tm. At this time, the transformation from the coordinate system Xw(X, Y, Z) to the camera coordinate system xh(x, y, z) of the moving body is assumed as expressed as follows, using the rotation matrix Rw and the translation vector Tw. Meanwhile, "*" represents a multiplication.

$$xh = Rw*(Xw-Tw) \qquad \text{(expression 1)}$$

Therefore, at the time t1, $$xh1 = Rw*(Xw1-Tw) \qquad \text{(expression 2)}$$

at the time t2, $$xh2 = Rw*(Xw2-Tw) \qquad \text{(expression 3).}$$

Here, assuming that the relationship between the vectors Xw1 and Xw2 between the time t1 and the time t2 is expressed as $$Xw2 = Rm*Xw1+Tm \qquad \text{(expression 4),}$$

according to the expression 3, expressed as follows.

$$Rw^T * xh2 + Tw = Rm * (Rw^T * xh1 + Tw) + Tm \quad \text{(expression 5)}$$
$$= Rm * Rw^T * xh1 + Rm * Tw + Tm.$$

The 5 is transformed as follows $$xh2 = Rw * Rm * Rw^T * xh1 + Rw * (Rm * Tw + Tm - Tw) = \quad \text{(expression 6)}$$
$$(Rw * Rm * Rw^T) * xh1 + Rw * ((Rm - I) * Tw + Tm).$$

In the expression 6, a substitution is performed as follows.

$$Rv = Rw * Rm * Rw^T$$

$$Tv = Rw * ((Rm-I) * Tw + Tm) \quad \text{(expression 7)}$$

Therefore, an expression $$xh2 = Rv * xh1 + Tv \quad \text{(expression 8)}$$

may be made.

This represents, when considered in the camera coordinate system, the relationship between coordinates in a case in which the moving body makes a movement of the rotation matrix Rm, the translation vector Tm from the time t1 to the time t2. Hereinafter, this camera coordinate system is adopted.

As explained in FIG. 4, the focal distance of the camera is assumed as a focal distance f. The feature point position (px1, py1) of the feature point P1 at the time t1, the feature point position (px2, py2) of the feature point P2 at the time t2 respectively represent the position on the image capturing plane. These feature point positions represents, in the camera coordinate system, the positions of a point (px1, py1,f), a point (px2,py2,f), respectively. Here, the following is assumed.

$$n1 = (px1, py1, f)$$

$$n2 = (px2, py2, f) \quad \text{(expression 9)}$$

At this time, as illustrated in FIG. 4, the position P where the extended line of the feature point position vector n1 at the time of t1 and the feature point position vector n2 at the time t2 intersect is the three-dimensional position of the object. The three-dimensional position in the camera coordinate system at the time t1 is assumed as a point P1, and the distance from the origin to the point P1 is assumed as a distance l1, and meanwhile, the three-dimensional position in the camera coordinate system at the time t2 is assumed as a P2, and the distance from the origin to the point P2 is assumed as a distance l2. Hereinafter, for the convenience of explanation, vectors representing points P1, P2 in the camera coordinate system are assumed as vectors P1, P2, respectively, and assuming the vectors n1, n2 as a unit vector that has the component of the expression 9, the expression 10 below is satisfied.

$$P1 = l1 * n1$$

$$P2 = l2 * n2 \quad \text{(expression 10)}$$

Here, for the vector P1 and the vector P2, from the expression 8, using a matrix Rv, a vector Tv. there is a relationship $$P2 = Rv * P1 + Tv \quad \text{(expression 11)},$$

from the expression 10, the expression 11, $$l2 * n2 = Rv * l1 * n1 + Tv \quad \text{(expression 12)}.$$

Here, assuming $N1 = Rv * n1$, $$l2 * n2 = l1 * N1 + Tv \quad \text{(expression 13)}.$$

Here, the description is altered as follows.

$$N1 = (NX1, NY1, NZ1)$$

$$n2 = (nx2, ny2, nz2) \quad \text{(expression 14)}$$

In addition, the vector Tv is defined, as follows, as a component expression.

$$Tv = (Tvx, Tvy, Tvz) \quad \text{(expression 15)}$$

Therefore, from the expression 13 through the expression 15, the component expression is made as follows.

$$l2 * nx2 = l1 * NX1 + Tvx$$

$$l2 * ny2 = l1 * NY1 + Tvy$$

$$l2 * nz2 = l1 * NZ1 + Tvz \quad \text{(expression 16)}$$

The simultaneous equation expression of the expression 16 is in the relationship of over-constraint with unknowns (l1, l2). Therefore, since the solution is not determined uniquely, an optimal solution by the method of least squares is obtained. Rewriting the simultaneous equation, it is expressed by the expression 17 below.

$$\begin{pmatrix} -NX1 & nx2 \\ -NY1 & ny2 \\ -NZ1 & nz2 \end{pmatrix} \begin{pmatrix} l1 \\ l2 \end{pmatrix} = \begin{pmatrix} Tvx \\ Tvy \\ Tvz \end{pmatrix}. \quad \text{(expression 17)}$$

Here, in the expression 17, an expression is made as in the expression 18.

$$N = \begin{pmatrix} -NX1 & nx2 \\ -NY1 & ny2 \\ -NZ1 & nz2 \end{pmatrix}, \quad \text{(expression 18)}$$

$$L = \begin{pmatrix} l1 \\ l2 \end{pmatrix},$$

$$T = \begin{pmatrix} Tvx \\ Tvy \\ Tvz \end{pmatrix}$$

Therefore, the expression 19 below is established.

$$N * L = T \quad \text{(expression 19)}$$

Therefore, the solution by the method of least squares is given by the expression 20 below.

$$L = (N^T * N)^{-1} * N^T * T \quad \text{(expression 20)}$$

From the expression 20, the distances l1, l2 are obtained, and the vector P2 indicating the three-dimensional position expressed in the camera coordinate system at the time t2 is expressed by the expression 21 below.

$$P2 = n2 * l2 \quad \text{(expression 21)}$$

Since the relationship of the camera coordinate system xh and the coordinate system Xw of the moving body is, as presented in the expression 1, $xh = Rw * (Xw - Tw)$, the expression 22 below is established.

$$Xw = Rw^T * xh + Tw \quad \text{(expression 22)}$$

Therefore, assuming the expression of the point P2 that is the three-dimensional position in the camera coordinate system in the coordinate system of the moving body as P(X, Y, Z), the position P that satisfies the expression 23 below is the eventual solution that represents the three-dimensional position.

$$P = Rw^T * P2 + Tw \quad \text{(expression 23)}$$

At this time, in the edge list 154, the three-dimensional position calculating unit refers to the matching process flag, and when the flag indicates that the matching has been successful, calculates the three-dimensional position P(X, Y, Z) as described above.

Figure 14:
FIG. 14 is a diagram illustrating an example of an object list.

FIG. 14 is a diagram illustrating an object list 158. The object list 158 is information regarding feature points o(i) matched by the matching unit 5. Here, the variable i is an integer 1 through No, and the number of elements No is the number of sets of the feature points for which the matching has been successful in the feature point matching unit 5. The object list 158 includes the three-dimensional position, the object number, the projected image lower position, the projected image upper position. The three-dimensional position calculating unit 9 registers the calculated three-dimensional position in the object list 158.

The three-dimensional position is the coordinates of the three-dimensional position P as described above in the moving body coordinate system. The object number is an identification number assigned according to the object by the object detecting process by the object detecting unit 11. The projected image upper position is the coordinates, in the camera coordinate system, of the point at which a point that is higher by a prescribed height in the Z axis of the moving body coordinate system than the position at which the feature point is projected on the road surface 54 is re-projected on the image captured at the second time for example. The projected image lower position is the coordinates, in the camera coordinate system, of a point at which a point that is away by a prescribed distance towards the lower side from the point at which the feature point is projected on the road surface 54 is re-projected on the image.

Next, the object detecting unit 11 is explained. The object detecting unit 11 detects an object from the feature point group for which the three-dimensional position has been calculated. As the object detection method, for example, a general labeling process in which a determination as an identical object is made when the three-dimensional distance between feature points is close is applied. The distance between the feature points may be calculated by with the three-dimensional position, or may be calculated with the two-dimensional position in the bird's-eye view coordinates that do not take into account the height direction.

The object detecting unit 11 prepares a copy of the object list 158 first. Hereinafter, the copied object list 158 is referred to as a copy list. The object detecting unit 11 detects an object by comparing the three-dimensional positions of the object list 158 and the copy list sequentially and assigning the same number to the object number of the object list 158 determined as an identical object. When detecting an object, the object detecting unit 11 uses a connection destination list illustrated in FIG. 15, FIG. 16. That is, the object detecting unit 11 assigns the initial object number to feature points o(i) first, but at this time, there may be a case in which, even for an identical object, the object numbers are different. For this reason, the object detecting unit 11 uses an object destination list 160 and a final object destination list 162 to organize the initial object numbers and to decide the final object number.

Figure 15:
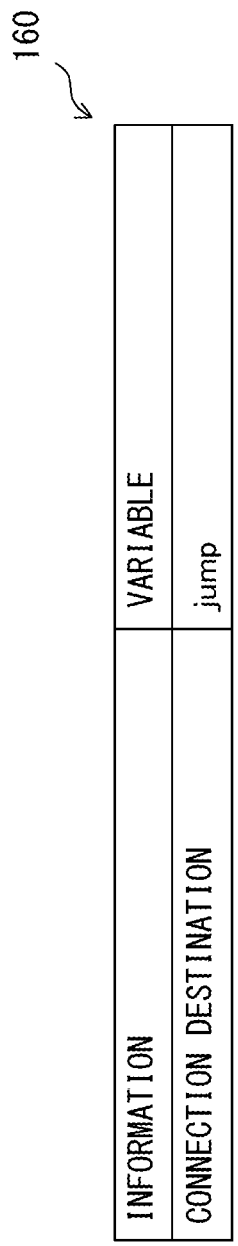
FIG. 15 is a diagram illustrating an example of a connection destination list.

FIG. 15 is a diagram illustrating an example of the object destination list, and FIG. 16 is a diagram illustrating an example of the final object destination list. As illustrated in FIG. 15, the object destination list 160 includes a connection destination jump(i) indicating the connection destination. As described above, the object destination list 160 is a list for, when a feature point determined as an identical object to the object number assigned earlier, associating the object number assigned earlier with the feature point. The variable i is an integer 1 through No, and the number of elements is the number No of assigned initial object numbers.

As illustrated in FIG. 16, the final object destination list 162 includes a connection destination jump2(i) indicating the organized final object number. The number of elements of the connection destination jump2(i) is the number of final object numbers.

Next, the moving object determining unit 13 is explained. The moving object determining unit 13 projects the calculated three-dimensional position of the object on the road surface 54 onto a captured image such as the image capturing plane 64, and compares it with the actual feature point position in the captured image. Accordingly, the moving object determining unit 13 is determines whether or not the target object is a target object whose three-dimensional position may be measured accurately.

The moving object determining unit sets the position at which the three-dimensional position is projected on the road surface and a position away from the position of the projection on the road surface by a certain height, and further, re-projects the respective positions on the captured image of the image capturing plane 64 for example. From the position of the re-projection mentioned above for each one object, the moving object determining unit 13 sets a search range in which the lower-end feature point of the object is expected to exist, and checks whether the object lower-end feature point exists within this search range.

For example, when a certain number of object lower-end feature points or more exist in the search range, the moving object determining unit 13 regards the calculated three-dimensional position is not a calculation error, as the calculated three-dimensional position and the object lower-end feature point match. On the other hand, when a certain number of object lower-end feature points or more do not exist in the search range, the moving object determining unit 13 regards the object as a moving object and the three-dimensional position as a calculation error, as the calculated three-dimensional position and the object lower-end feature point do not match, that is, there is a geometric contradiction.

Figure 17:
FIG. 17 is a diagram illustrating an example of a number of items list.

FIG. 17 is a diagram illustrating an example of a number of items list 164. The number of items list 164 is information that the moving object determining unit 13 uses to determine whether or not the object lower-end feature point exists in the search range. The number of items list 164 is expressed as element n(no) using the object number no. The number of items list 164 is the number count num of feature points determined as an identical object. The number of elements of the number of items list 164 is the number of final object numbers.

Figure 18:
FIG. 18 is a diagram illustrating an example of the search list.

FIG. 18 is a diagram illustrating an example of a search list 166. The search list 166 is information representing the search range for each one object.

The search list 166 includes the minimum value, the maximum value in the x direction, and the minimum value, the maximum value in the y direction in the search range. The content of the search list 166 is expressed by element s(no)

using the object number no. The number of elements of the search list 166 is the number of final object numbers.

Figure 19:
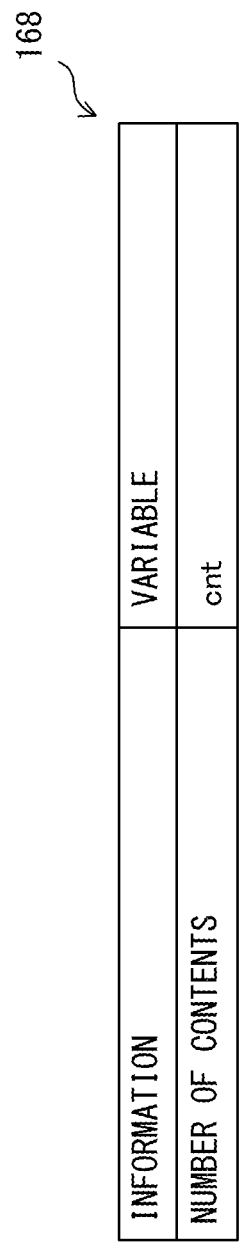
FIG. 19 is a diagram illustrating an example of a content list.

FIG. 19 is a diagram illustrating an example of a content list 168. The content list 168 is information of the number cnt of feature points included in the search range of each object. The number of feature points is expressed as cnt(no) using the object number no. The number of elements of the content list 168 is the number of final object numbers.

Figure 20:
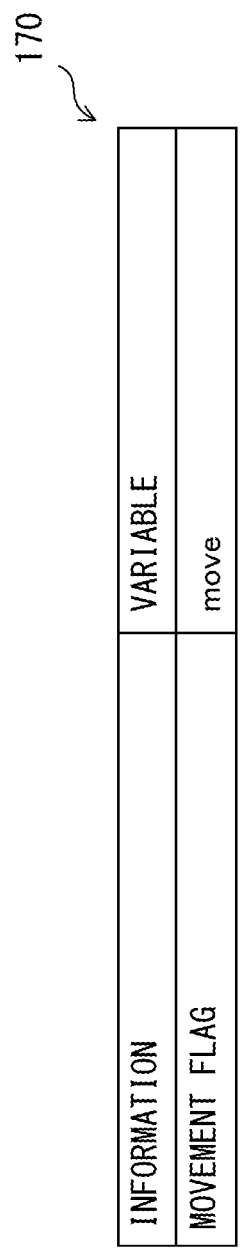
FIG. 20 is a diagram illustrating the moving/stationary list.

FIG. 20 is a diagram illustrating a moving/stationary list 170. The moving/stationary list 170 is information of a flag move indicating whether or not the calculated three-dimensional position is that of a moving body. The content of the moving/stationary list 170 is expressed by element m(no) using the object number no. The number of elements of the moving/stationary list 170 is the number of final object numbers.

Figure 21:
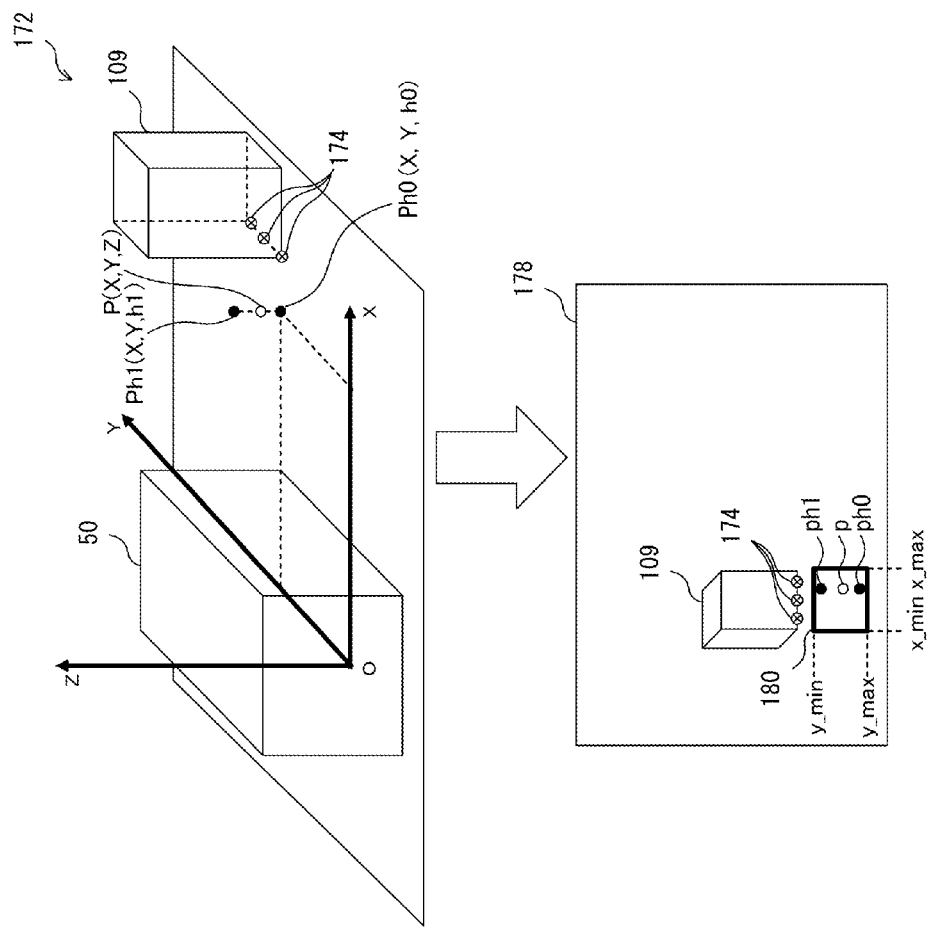
FIG. 21 is a diagram explaining an example of the judgment of a moving object.

FIG. 21 is a diagram explaining an example of the determination of a moving object. As illustrated in FIG. 21, in the present embodiment, the moving body coordinate system with a point of the vehicle 50 on the road surface 54 as the origin O and the camera coordinate system with the camera position to capture the image of an image capturing plane 178 as the origin are defined. It is assumed that a moving object 109 exists in the surroundings of the vehicle 50, and the lower-end position 174 of the moving object 109 has been extracted as a feature point. Meanwhile, the point at which the calculated three-dimensional position P(X, Y, Z) is projected on the road surface 54 is assumed as a point Ph0(X, Y, h0), and the point away from the point Ph0 by a certain height is assumed as a point Ph1(X, Y, h1). The points at which the points Ph0, Ph1 are projected on the image capturing plane 178 are assumed as projection points ph0, ph1, respectively. Meanwhile, a point p is a point at which the calculated the three-dimensional position P is re-projected on the image capturing plane 178. The moving object determining unit 13 sets a search range 180 based on the projection point with respect to the feature point of each moving object 109, and determines whether or not the lower end of the moving object 109 in the image capturing plane 178 exists in the search range.

Figure 22:
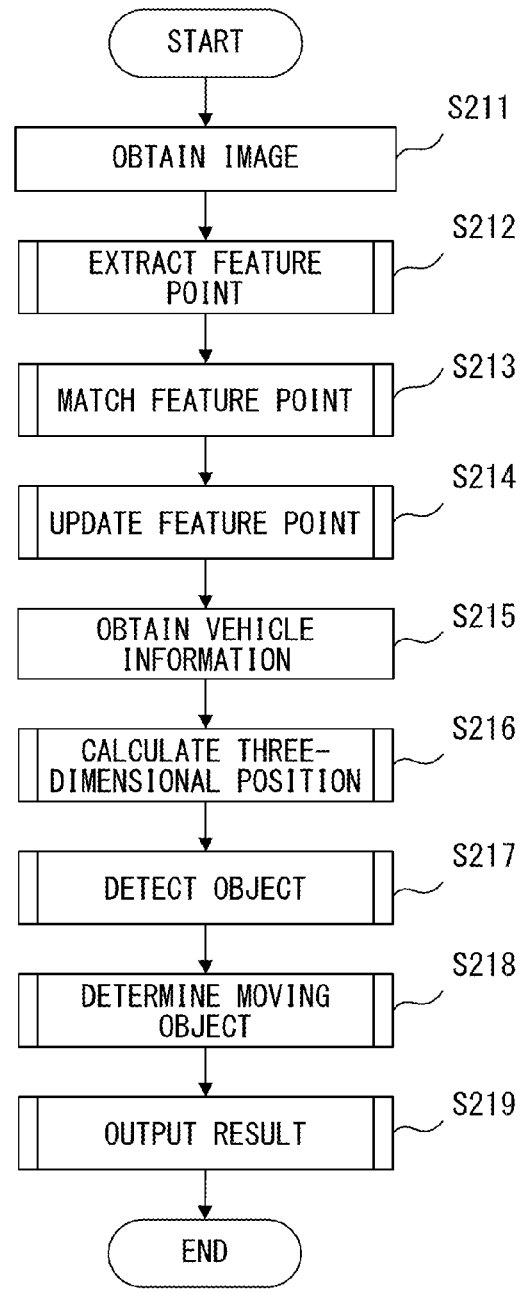
FIG. 22 is a flowchart illustrating the main operations of a distance measuring apparatus.

Processes performed in the distance measuring apparatus 1 configured as described above are further explained with reference to the flowcharts. FIG. 22 is a flowchart illustrating main operations of the distance measuring apparatus 1 according to the present embodiment. As illustrated in FIG. 22, the distance measuring apparatus 1 obtains an image captured by the camera 21 (S211). Meanwhile, the camera 21 captures the image at every prescribed time for example, in the condition in which the vehicle 50 is traveling. The feature point extracting unit 3 of the distance measuring apparatus 1 extracts feature points from the obtained image (S212).

The feature point matching unit 5 match feature points of the current frame extracted by feature point extracting unit 3 and the feature point extracted in the preceding frame, and extracts a point determined as displayed in common (S213). The feature point updating unit 7 updates the registration list 156 to the content of the edge list 154, and makes it stored in the feature point DB 17 (S214).

The three-dimensional position calculating unit 9 obtains vehicle information from the vehicle speed sensor 23, the steering angle sensor 24 for example (S215). The vehicle information is information indicating the position of the vehicle 50. The three-dimensional position calculating unit 9 calculates the three-dimensional position and generates the object list 158, based on the obtained vehicle information and the edge list 154 (S216).

The object detecting unit 11 detects an object based on the object list 158 (S217). The moving object determining unit 13 detects the search range for each object from the generated object list 158, and based on whether or not the lower-edge position of the detected object is included in the search range, determines whether or not the object is a moving object (S218). The outputting unit 15 deletes the three-dimensional position determined as a moving object, and outputs the calculated three-dimensional position (S219).

Details of the processes described above are further explained below. FIG. 23 is a flowchart illustrating details of a feature point extracting process. The feature point extracting process is the process of S212 in FIG. 22. As illustrated in FIG. 23, the feature point extracting unit 3 performs an edge process in the obtained image (S231). When the edge intensity is determined as equal to or larger than a threshold (S232: YES), the position (nx, ny) regarding the feature point e(s1), the pattern information vn(b·a), the matching process flag flag=0, the number of elements Ne=Ne+1 are resisted in the edge list 154 (S233). In S232, in the case of smaller than a threshold, feature point extracting unit 3 moves the process forward to S234 (S232: NO). The processes of S231 through S233 are repeated until the processes are completed for all pixels (S234: NO), and upon completion (S234: YES), the feature point extracting unit 3 terminates the feature point extracting process.

Figure 24:
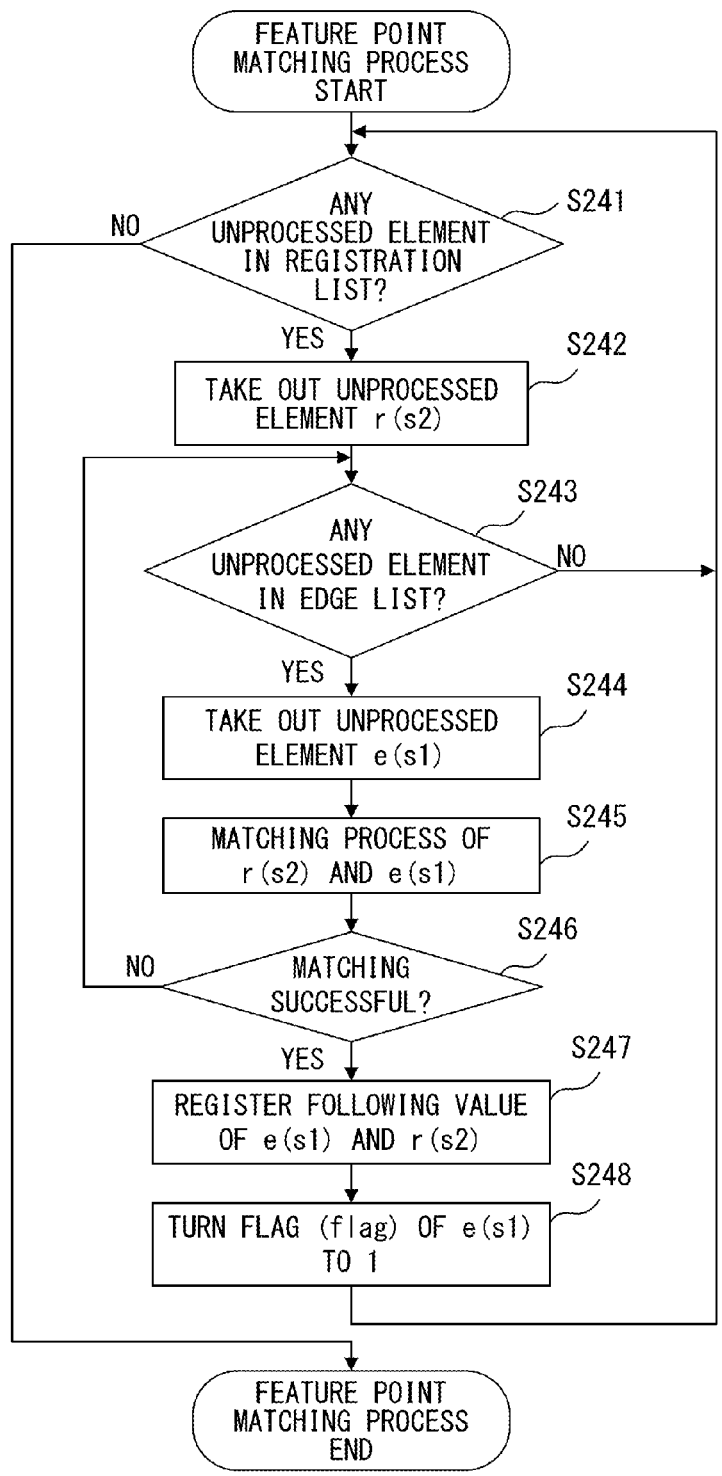
FIG. 24 is a flowchart illustrating details of a feature point matching process.

FIG. 24 is a flowchart illustrating details of a feature point matching process. The feature point matching process is the process of S231 in FIG. 22. As illustrated in FIG. 24, the feature point matching unit 5 determines whether or not there is any unprocessed element in the registration list 156 (S241). When there is an unprocessed element, the feature point matching unit 5 extracts an unprocessed element r(s2) from the registration list 156 stored in the feature point DB 17 (S242). The feature point matching unit 5 determines whether or not there is any unprocessed element in the edge list 154 (S243), and when there is any (S243: YES), takes out the unprocessed element e(s1) from the edge list 154 (S244).

The feature point matching unit 5 matches the taken-out element r(s2) and the element e(s1) (S245). That is, as described above, based on parameter information, whether or not they are a point displayed in common is determined. When the matching is successful and they are determined as a point displayed in common (S246: YES), the feature point matching unit 5 registers the feature point position (rx, ry) of the element r(s2) as the past feature point position of the element e(s1) in the edge list 154 (S247). In addition, the feature point matching unit 5 sets the matching flag of the element e(s1) as flag=1 (S248), and brings the process back to S241. The feature point matching unit 5 executes the process described above until there is no unprocessed element r(s2) in the registration list 156, and when there is no more (S241: NO), terminates the feature point matching process.

Figure 25:
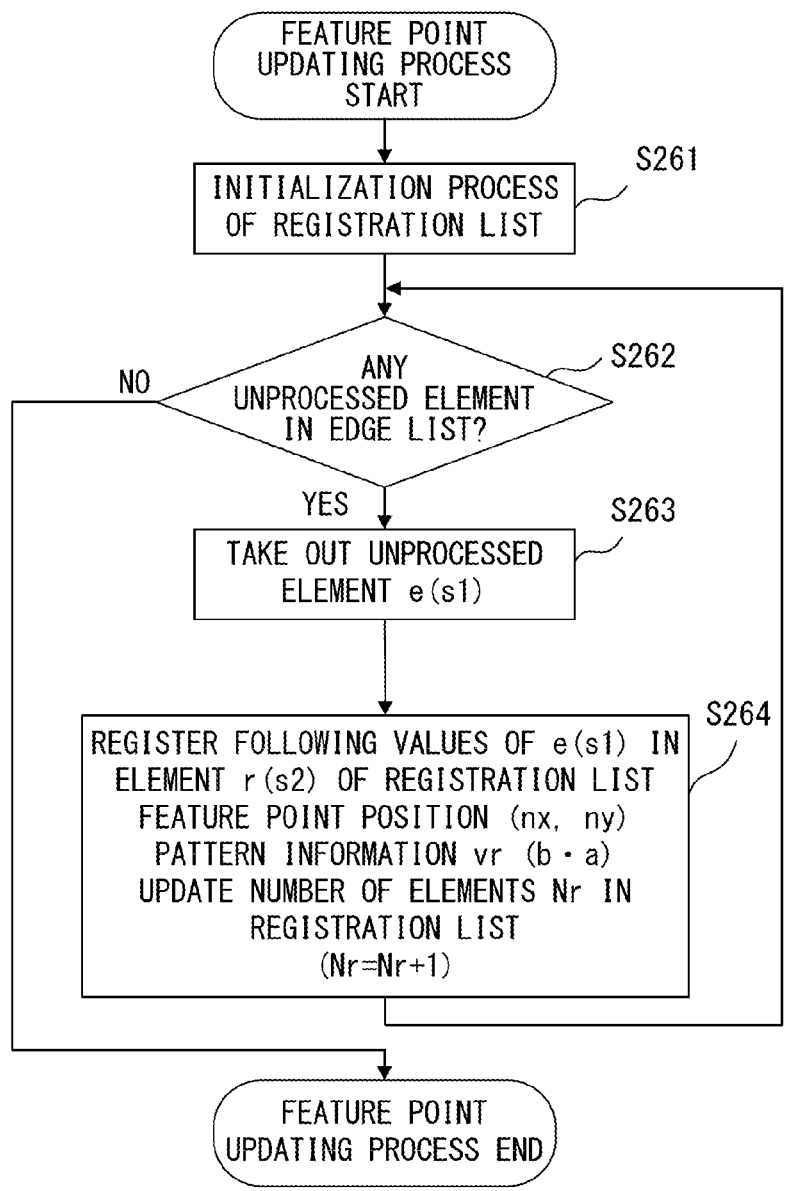
FIG. 25 is a flowchart illustrating details of a feature point updating process.

FIG. 25 is a flowchart illustrating details of a feature point updating process. The feature point updating process is a process of S214 in FIG. 22. As illustrated in FIG. 25, the feature point updating unit 7 initializes the registration list 156 (S261). The feature point updating unit 7 determines whether or not there is any unprocessed element e(s1) (S262), and there is any (S262: YES), takes out the unprocessed element e(s1) (S263). Regarding the taken-out element e(s1), the feature point updating unit 7 registers the current feature point position (nx, ny) and the pattern information vn(b·a) in the feature point position(rx, ry) and the pattern information vr(b·a) of the element r(s2) in the registration list 156 (S264). The feature point updating unit 7 brings back the process to S261, and performs the processes of S262 through S264 for each element e(s1) in the edge list 154. When there is no more unprocessed element (S262: NO), the feature point updating unit 7 terminates the feature point updating process.

Figure 26:
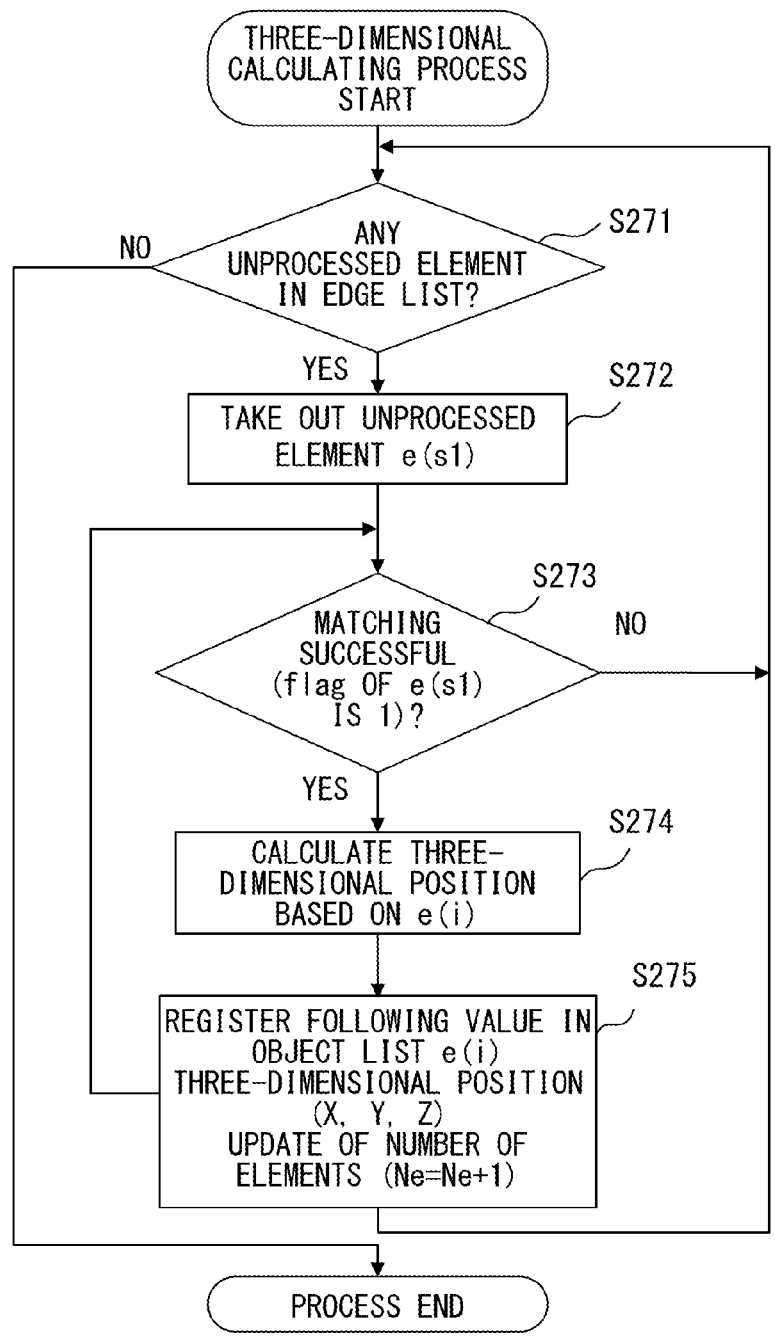
FIG. 26 is a flowchart illustrating details of a three-dimensional position calculating process.

FIG. 26 is a flowchart illustrating details of a three-dimensional position calculating process. The three-dimensional position calculating process is the process of S216 in FIG. 22. As illustrated in FIG. 26, the three-dimensional position calculating unit 9 determines whether or not there is any unprocessed element e(s1) in the edge list 154 (S271), and when there is any (S271: YES), takes out the unprocessed element e(s1) (S272). The three-dimensional position calculating unit 9 checks the matching process flag of the taken-out element e(s1), and when it indicates the success of the matching (S273: YES), based on the information of the element e(s1) in the edge list 154, calculates the three-dimensional position as described above (S274).

At this time, the three-dimensional position calculating unit 9 calculates the three-dimensional position from the feature point positions at the two times for which the matching has been successful in the feature point matching unit 5 and the vehicle behavior (the amount of movement of the camera). The vehicle behavior is obtained from sensors such as the vehicle speed sensor 23, the steering angle sensor 24 and the like.

The three-dimensional position calculating unit 9 registers the calculated the three-dimensional position (X, Y, Z) in the object list 158, and performs an update as the number of elements No=No+1 for the element e(s1) for which the matching has been successful (S275). Bringing back the process to S271, the three-dimensional position calculating unit 9 terminates the process when there is no unprocessed element e(s1) (S271: NO).

Figure 27:
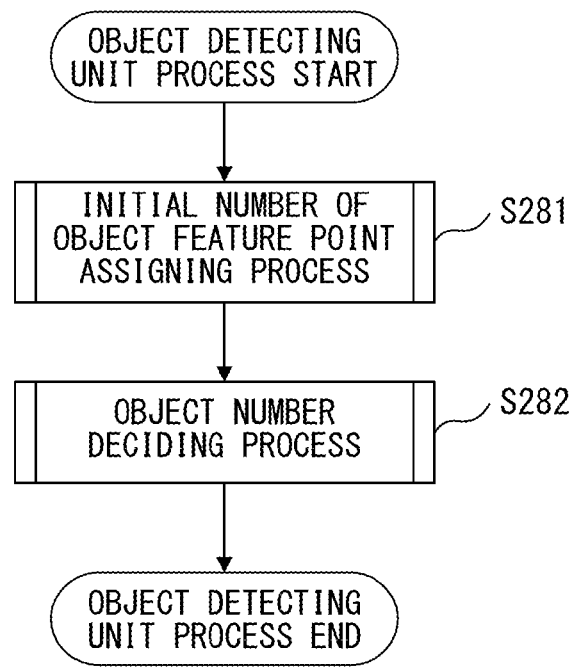
FIG. 27 is a flowchart illustrating an object detecting process.

FIG. 27 is a flowchart illustrating an object detecting process. The object detecting process is a process of S217 in FIG. 22. As illustrated in FIG. 27, the object detecting unit 11 assigns an initial number to an object feature point, in the object list 158 (S281). The object detecting unit 11 performs a deciding process of the object number (S282), and terminates the object detecting process.

Figure 28A:
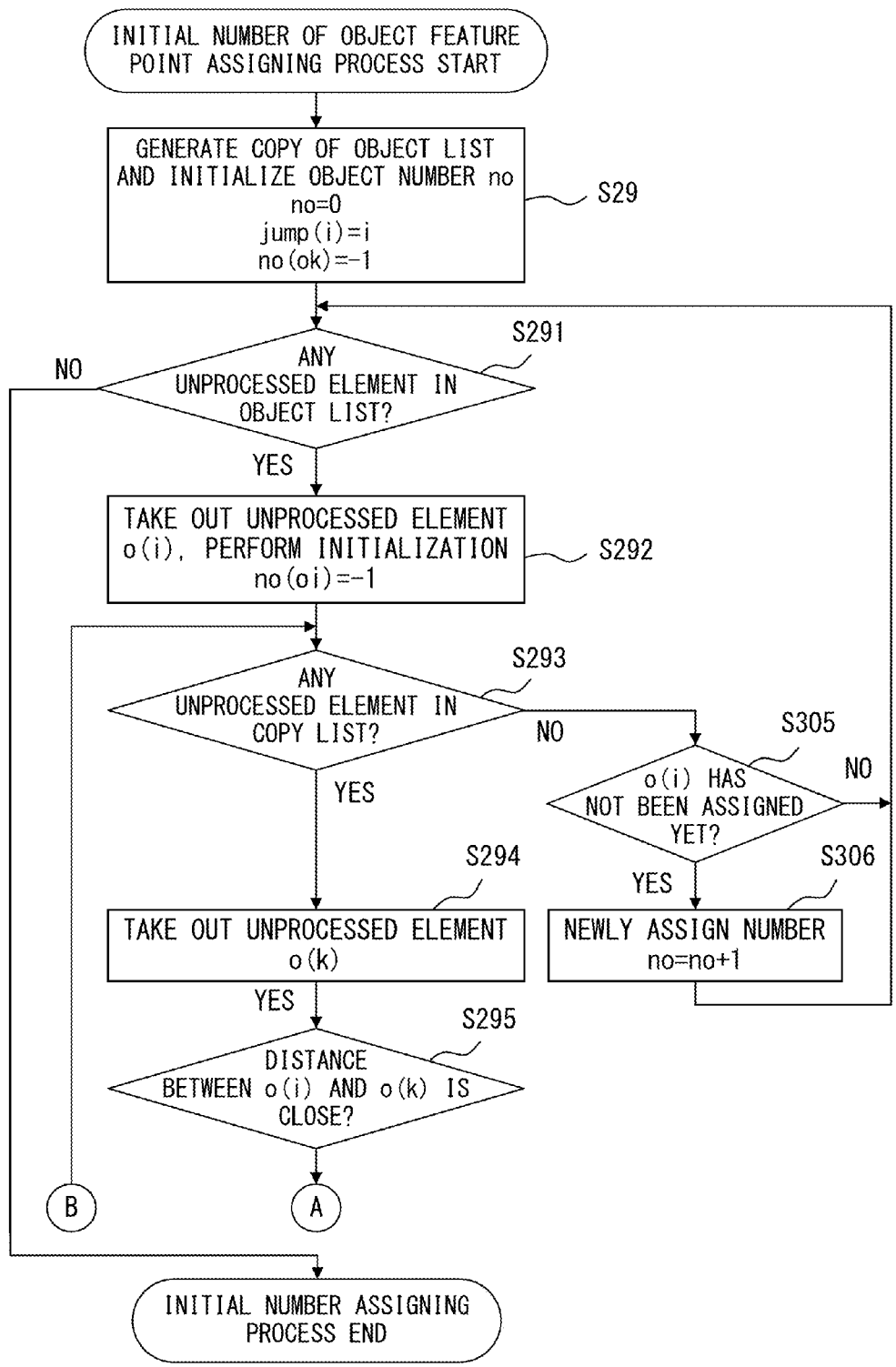
FIG. 28A is a flowchart illustrating details of an initial number assigning process.
Figure 28B:
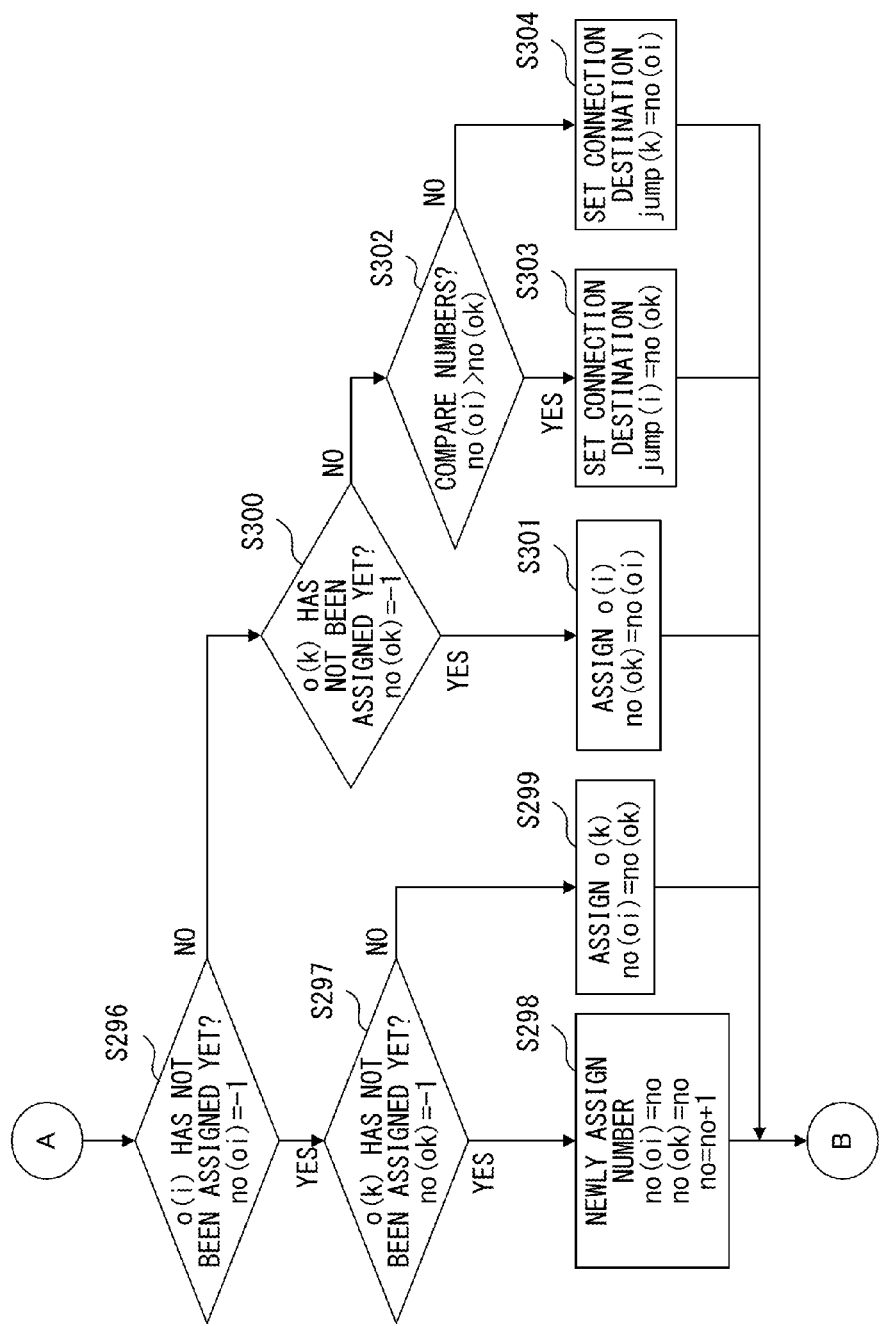
FIG. 28B is a flowchart illustrating details of an initial number assigning process.

Next, details of the object detecting process are further explained. FIGS. 28A, 28B are flowcharts illustrating details of an initial number assigning process. The initial number assigning process is the process of S281 in FIG. 27. As illustrated in FIG. 28A, the object detecting unit 11 generates a copy list that is a copy of the object list 158. In addition, the object detecting unit 11 performs an initialization as the object number no=0, the object number no(ok) =−1. Further, the object detecting unit 11 performs an initialization as the connection destination jump(i)=i described later (S290).

Here, the variable i is an integer 1 through No. The number of elements No is the number of elements in the object list 158, and is the number of elements e(s1) for which the matching has been successful. Meanwhile, the object number no refers to the object number in the object list 158 in the case of usage without distinction by the variable i. Object numbers no(oi), no(ok) described later refer to the object numbers no corresponding to elements o(i), o(k), respectively.

The object detecting unit 11 determines whether or not there is any unprocessed element o(i) in the object list 158 (S291), and when there is any (S291: YES), takes out the unprocessed element o(i) (S292). Meanwhile, "−1" of the object number indicates that the object number no has not been assigned yet.

The object detecting unit 11 determines whether or not there is any unprocessed element o(k) (k is an integer 1 through No) in the copy list (S293), and when there is any (S293: YES), takes out the unprocessed element o(k) from the copy list, and performs an initialization as the object number no(oi)=−1 (S294). The object detecting unit 11 determines whether or not the distance between the three-dimensional positions of the element o(i) and the element o(k) is closer than a prescribed distance (S295). When the distance is closer than a prescribed distance (S295: YES), the object detecting unit 11 moves the process forward to S296. When the distance is not close (S295: NO), the object detecting unit 11 brings back the process to S293.

In S293, when there is not unprocessed element in the copy list (S293: NO), the object detecting unit 11 determines whether or not the object number no(oi) has not been assigned yet (S305). When it has not been assigned yet (S305: YES), the object detecting unit 11 assigns the object number no(oi)=no, and a new object number no, to make no=no+1, and brings back the process to S291.

In S291, when there is no unprocessed element in object list 158 (S291: NO), it means that the process has been completed for all the elements in the object list 158 and the copy list, and the object detecting unit 11 terminates the initial number assigning process.

As illustrated in FIG. 28B, in S296, the object detecting unit 11 determines whether or not the object number no(oi) of the object list 158 has not been assigned yet, that is, whether or not the object number no(oi)=−1. When it has not been assigned yet (S296: YES), the object detecting unit 11 further determines whether or not the object number no(ok) has not been assigned yet, that is, whether or not the object number no(ok)=−1 (S297). When it has not been assigned yet (S297: YES), the object detecting unit 11 assigns the object number no(oi)=no, the object number no(ok)=no and a new object number no, and also, makes no=no+1 (S298), and brings back the process to S293.

In S297, when it is not that the object number no (ok) has not been assigned yet (S297: NO), the object detecting unit 11 makes the object number no(oi)=the object number no(ok) (S299), and brings back the process to S293.

In S296, when it is not that the object number no(oi) has not been assigned yet (S296: NO), the object detecting unit 11 further determines whether or not the object number no(ok) has not been assigned yet, that is, whether or not the object number no(ok)=−1 (S300). When it has not been assigned yet (S300: YES), the object detecting unit 11 makes the object number no(ok)=the object number no(oi) (S301), and brings back the process to S293.

In S300, when it is not that the object number no(ok) has not been assigned yet (S300: NO), the object detecting unit 11 determines whether or not the object number no(oi)>the object number no(ok) (S302). When the object number no(oi)>the object number no(ok) (S302: YES), the object detecting unit 11 makes the connection destination jump(i) =the object number no(ok) (S303), and brings back the process to 293. When it is not the object number no(oi)>the object number no(ok) (S302: NO), the object detecting unit 11 makes the connection destination jump(k)=the object number no(oi) (S304), and brings back the process to S293. Here, an object destination list 16 is a set of information of the connection destination jump(i) as the connection destination. Meanwhile, the number of elements of the object destination list 160 is the number of assigned initial object numbers.

Figure 29:
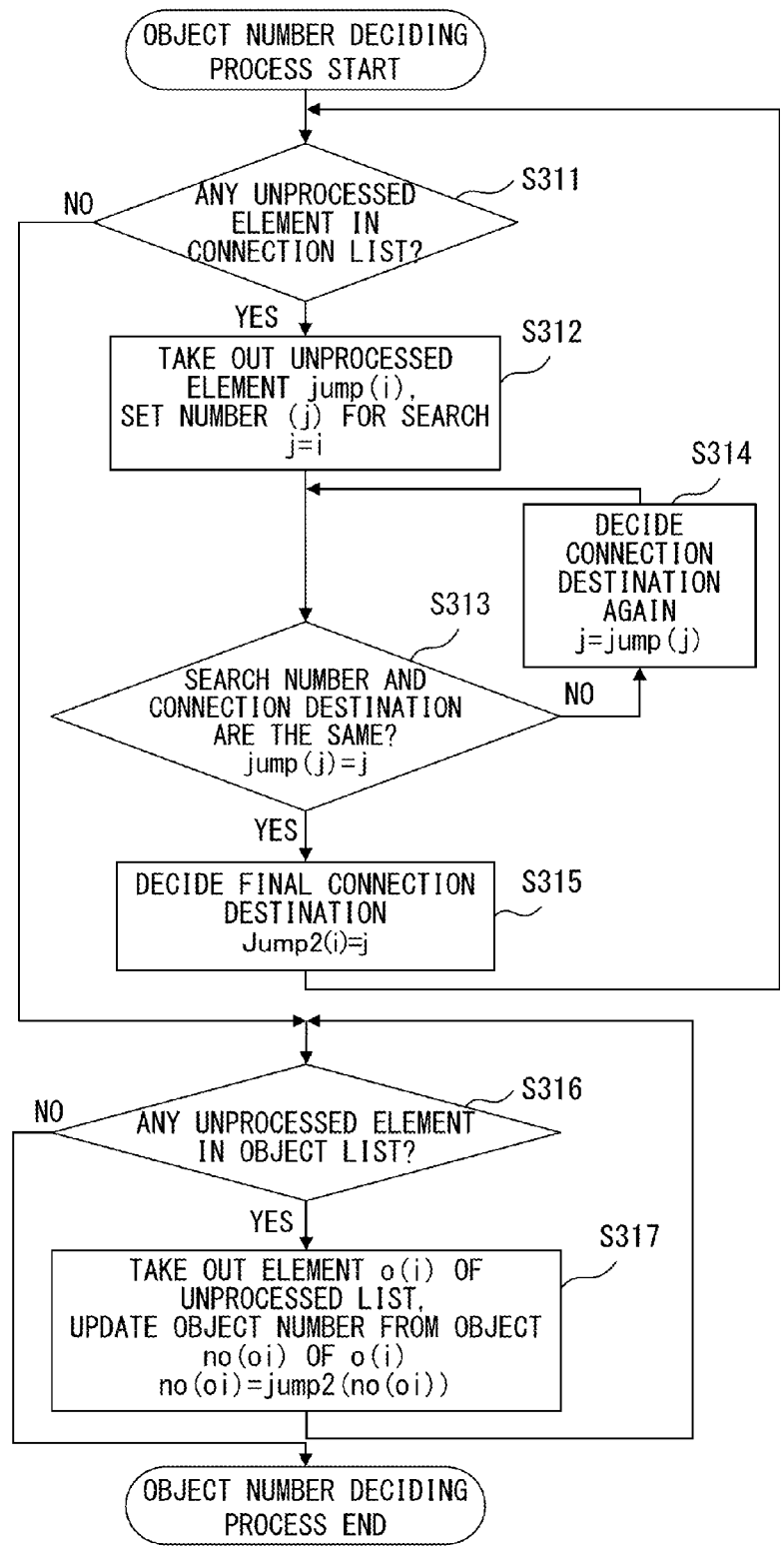
FIG. 29 is a flowchart illustrating details of a deciding process of an object number.

FIG. 29 is a flowchart illustrating details of the deciding process of the object number. This process is details of the process of S282 in FIG. 27, and is a process to organize the object initial number and to assign the final object number. As illustrated in FIG. 29, the object detecting unit 11 determines whether or not there is any unprocessed element in the object destination list 160 (S311). When there is any unprocessed element (S311: YES), the object detecting unit 11 takes out the unprocessed connection destination jump(i), and sets a number j for search as j=i (S312).

The object detecting unit 11 determines whether or not the number j for search and the connection destination jump(j) are the same, that is, whether or not the connection destination jump(j)=j (S313). When they are not the same (S313: NO), the object detecting unit 11 sets the connection destination again as j=connection destination jump(j) (S314), and repeats the processes of S313, S314 until the number j=connection destination jump(j).

When the number j for search=the connection destination jump(j) (S313: YES), the object detecting unit 11 decides the final connection destination jump2(i)=j (S315), registers it in the final object destination list 162, and also, brings back the process to S311.

In S311, when there is no unprocessed element in the object destination list 160 (S311: NO), the object detecting unit 11 determines whether or not there is any unprocessed element in the object list 158 (S316). When there is any unprocessed element (S316: YES), the object detecting unit 11 takes out the unprocessed element o(i), and makes an update for the element o(i) as the object number no(oi) =connection destination jump2(no(oi)) (S317). The number of elements of the final object destination list 162 is the number of organized final object numbers. In S316, when there is no unprocessed element (S316: NO), the process is terminated. According to this process, for each element o(i) of the object list 158, the final object number is decided. The number of object numbers decided here is the number of final object numbers.

Figure 30:
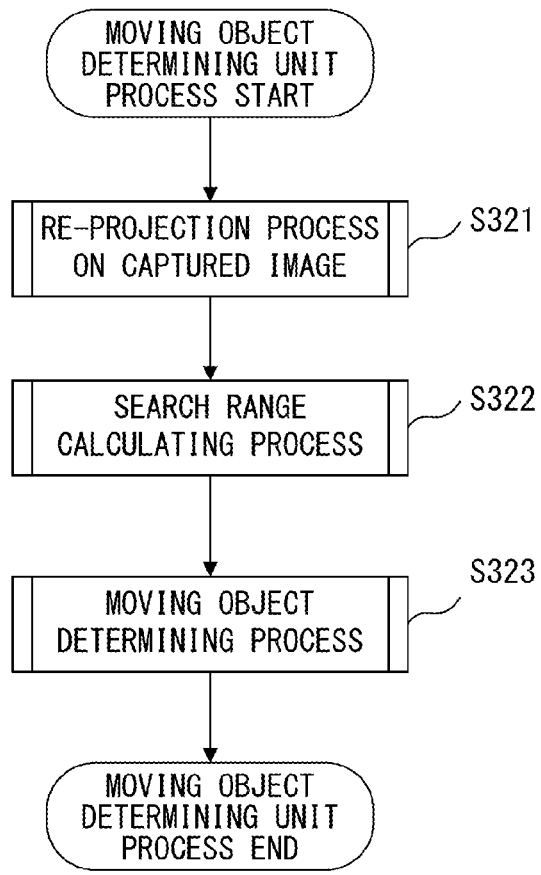
FIG. 30 is a flowchart illustrating an example of a moving object determining process.

Next, with reference to FIG. 30, the detail operations of the moving object determining unit 13 are explained. FIG. 30 is a flowchart illustrating an example of a moving object determining process by the moving object determining unit 13. The moving object determining process is the process of S218 in FIG. 22. In the moving object determining unit 13, the calculated three-dimensional position on the road surface position of the object is projected on the captured image and compared with the actual feature point position, to determine whether it is a moving object or a stationary object.

As illustrated in FIG. 30, the moving object determining unit 13 performs a re-projecting process on the captured image based on the calculated three-dimensional position (S321). The moving object determining unit 13 calculates the search range (S322). Further, the moving object determining unit 13 performs the moving object determining process (S323).

Figure 31:
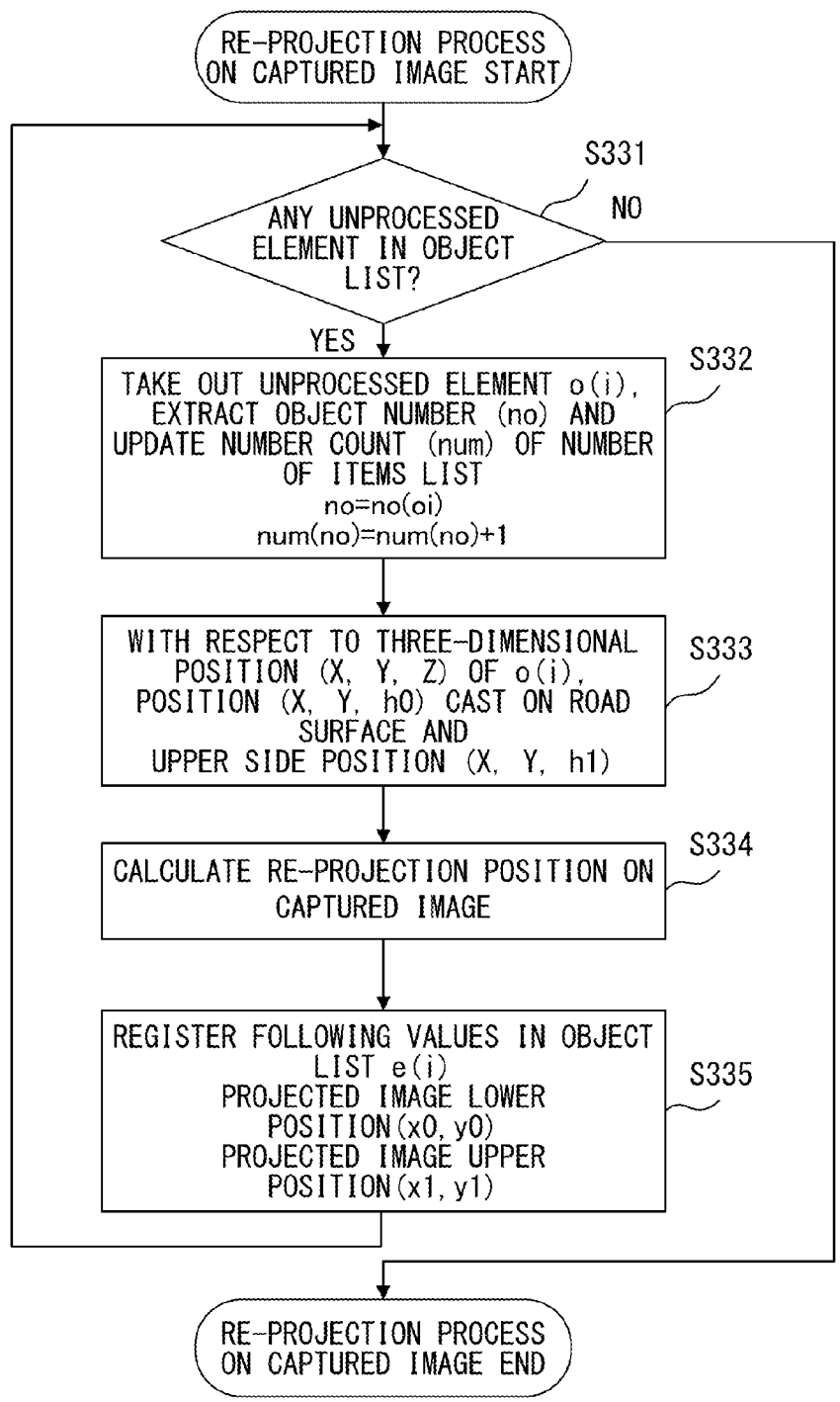
FIG. 31 is a flowchart illustrating details a re-projecting process on a captured image.

FIG. 31 is a flowchart illustrating details of the re-projecting process on the captured image. The re-projecting process is the process of S321 in FIG. 30. As illustrated in FIG. 31, the moving object determining unit 13 determines whether or not there is any unprocessed element in the object list 158 (S331). When there is any unprocessed element, the moving object determining unit 13 takes out the unprocessed element o(i), extracts the object number no and updates the number count num of the number of items list 164 (S332).

That is, the moving object determining unit 13 sets no=the object number no(oi), num(no)=num(no)+1.

With respect to the three-dimensional position (X, Y, Z) of the feature point, the moving object determining unit 13 sets a position (X, Y, h0) cast on the road surface, and a position (X, Y, h1) away by a certain height (S333). Here, for example, h0 may be −10 cm, and h1 may be 50 cm.

The moving object determining unit 13 re-project the respective positions on the captured image such as the image capturing plane 178 in FIG. 21 for example (S334). Next, the moving object determining unit 13 registers the re-projected image positions (x0, y0), (x1, y1) on the captured image in the object list 158 (S335). When there is no unprocessed element in the object list 158 (S331: NO), the moving object determining unit 13 terminates the re-projecting process.

Meanwhile, the re-projection on the captured image may be performed using the expression 1 (xh=Rw·(Xw−Tw)) mentioned earlier using the rotation matrix Rw and the translation vector Tw representing the transform from the moving body coordinate system Xw to the camera coordinate system xh.

Figure 32:
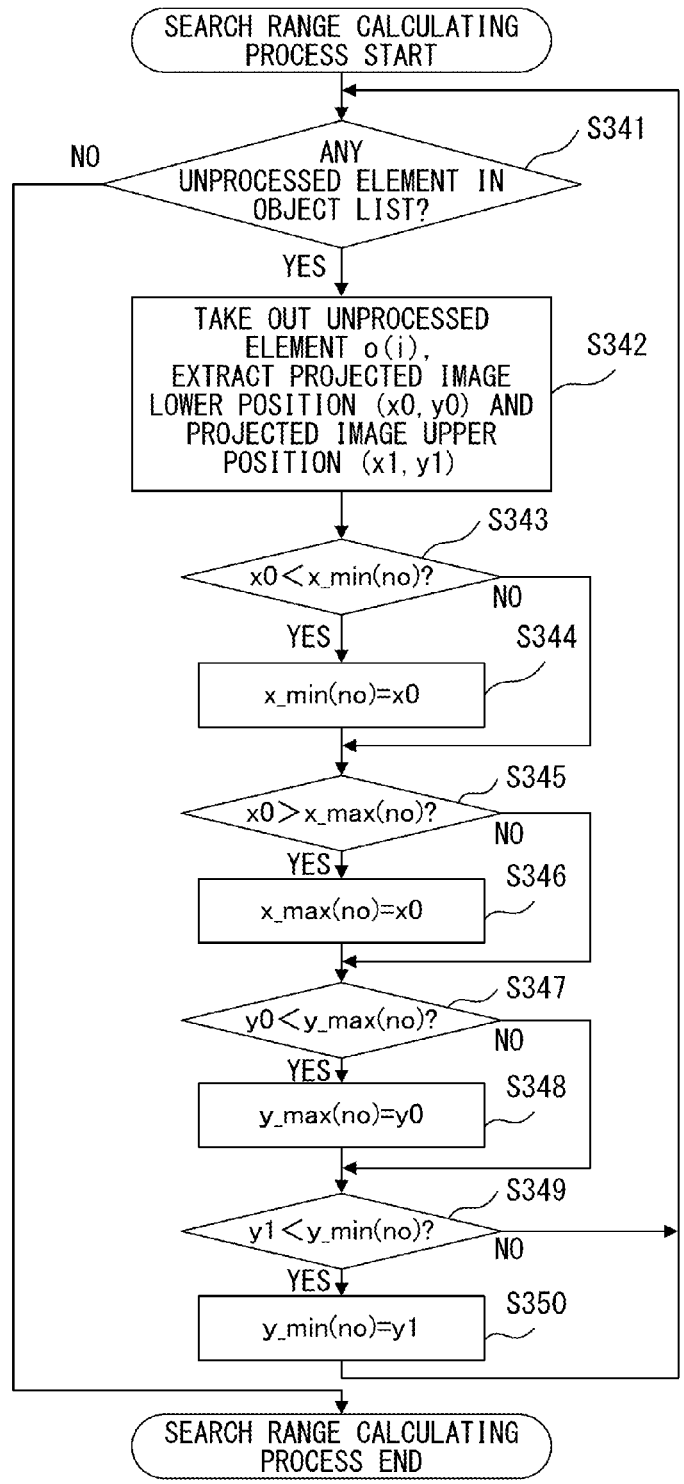
FIG. 32 is a flowchart illustrating details of a search range calculating process.

FIG. 32 is a flowchart illustrating details of a search range calculating process. The search range calculating process is the process of S322 in FIG. 30. The moving object determining unit 13 determines whether or not there is any unprocessed element in the object list 158 (S341). When there is any unprocessed element (S341: YES), the moving object determining unit 13 takes out the unprocessed element o(i), and takes out the re-projected image positions (x0, y0), (x1, y1) (S342). Here, x0=x1, y0>y1.

The moving object determining unit 13 determines whether or not x0<x_min(no) (S343), and in the case of YES, sets x_min(no)=x0 (S344). In the case of NO in S343, the moving object determining unit 13 moves the process forward to S345.

The moving object determining unit 13 determines whether or not x0>x_max(no) (S345), and in the case of YES, sets x_max(no)=x0 (S346). In the case of NO in S345, the moving object determining unit 13 moves the process forward to S347.

The moving object determining unit 13 determines whether or not y0>y_max(no) (S347), and in the case of YES, sets y_max(no)=y0 (S348). In the case of NO in S347, the moving object determining unit 13 moves the process forward to S349.

The moving object determining unit 13 determines whether or not y1<y_min(no) (S349), and in the case of YES, sets y_min(no)=y1 (S350). In the case of NO in S349, the moving object determining unit 13 brings back the process to S341.

In S341, when it is determines that there is no unprocessed element in the object list 158 (S341: NO), the moving object determining unit 13 terminates the search range calculating process.

Next, the moving object determining unit 13 checks whether or not any object lower-end feature point exists in the set search. When it is determined that a certain number of object lower-end feature points or more exist in the search range, it is regarded as a stationary object, as the distance measuring point and the object lower-end feature point match. On the other hand, when it is determined that a certain number of object lower-end feature points or more do not exist in the search range, it is regarded as a moving object, as the distance measuring point and the object lower-end feature point do not match, that is, there is a geometric contradiction. Specifically, by the ratio (content rate) at which the feature points of the object are included in the calculated search range, whether the target object is a moving object or a stationary object, that is, whether or not the calculated three-dimensional position is a calculation error is determined.

Figure 33:
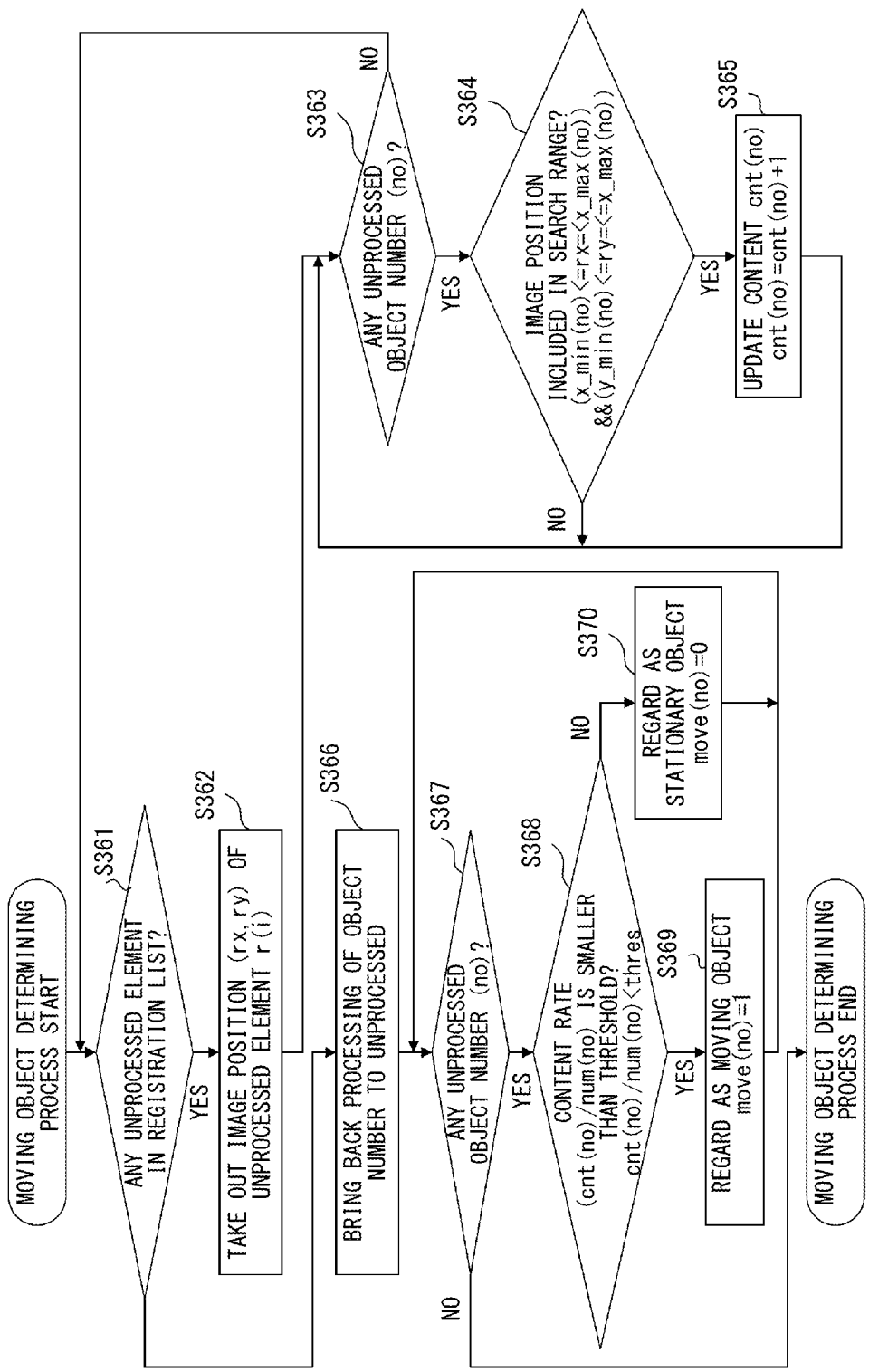
FIG. 33 is a flowchart illustrating details of a judging process of a moving object.

FIG. 33 is a flowchart illustrating details of a moving object determining process. The moving object determining process is the process of S323 in FIG. 30. As illustrated in FIG. 33, the moving object determining unit 13 determines whether or not there is any unprocessed element in the registration list 156 (S361), and when there is any (S361: YES), the moving object determining unit 13 takes out image position (rx,ry) of the element r(s2) of the registration list 156 (S362).

The moving object determining unit 13 determines whether or not there is any unprocessed object number no, in the objects detected by the object detecting unit 11 (S363). When there is no unprocessed object number (S363: NO), the moving object determining unit 13 brings back the process to S361. When there is any unprocessed object number (S363: YES), the moving object determining unit 13 determines whether the image position (rx, ry) is included in the search range (x_min, x_max, y_min, y_max) of the search list 166 (S364). When it is included (S364: YES), the number of content of the content list 168 is updated as cnt=cnt+1 (S365), the process is brought back to S363, and the processes in S363 through S365 are repeated until there is no unprocessed the object number.

After the process described above is performed for all the elements r(s2) of the registration list 156, the moving object determining unit 13 brings back to the processing of the object numbers all to unprocessed (S366). The moving object determining unit 13 determines whether or not there is any unprocessed object number. (S367). When there is any (S367: YES), the moving object determining unit 13 calculates the content rate=(cnt(no)/num(no)) for each object no. Further, when the content rate is smaller than a threshold thres (S368: YES), the moving object determining unit 13 regards it as a moving object, and makes a movement flag move of the moving/stationary list 170=1 (S369).

When the content rate is equal to or larger than the threshold (S368: NO), the moving object determining unit 13 regards the target object as a stationary object, and makes the movement flag move of the moving/stationary list 170=0 (S370). The threshold thres for the moving object judgment may be 0.3 for example. Upon determining that there is no unprocessed the object number (S367: NO), the moving object determining unit 13 terminates the process.

Figure 34:
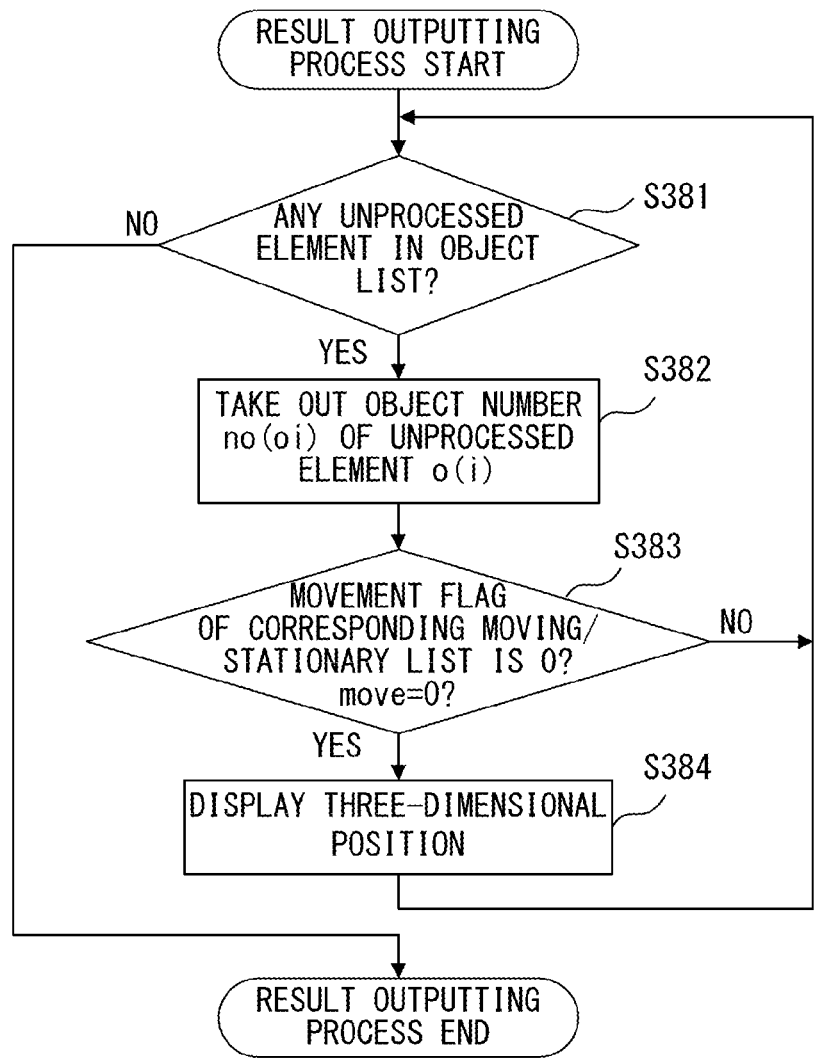
FIG. 34 is a flowchart illustrating details of a result outputting process.

FIG. 34 is a flowchart illustrating details of a result outputting process. The result outputting process is the process in of S219 in FIG. 22. The outputting unit 15 displays only the feature point determined as a stationary object by the moving object determining unit 13. As illustrated in FIG. 34, the outputting unit 15 determines whether or not there is any unprocessed element in the object list 158 (S381). When there is any (S381: YES), the outputting unit 15 takes out the object number no(oi) of the element o(i) of the object list 158, and determines whether or not the movement flag move of the corresponding element o(i) is "0" (S383). When it is "0" (S383: YES), the target object is regarded as a stationary object, and the three-dimensional position is displayed (S384). On the other hand, when the movement flag move is "1" (S383: NO), the target object is a moving object, and therefore, the outputting unit 15 does not display the three-dimensional position, and brings back the process to S381. The above process is performed to all the elements o(i) of the object list 158. When there is no object in the unprocessed object list 158 (S381), the outputting unit 15 terminates the outputting process.

As described above, the distance measuring apparatus 1 according to the present embodiment captures images at two times while traveling for example, using one unit of camera 21 attached to the vehicle 50, and measures the three-dimensional position of the feature point on an object in the surroundings in view of the amount of movement of the vehicle 50. At this time, in the case in which the target object is a moving object and is subject to the epipolar constraint, the three-dimensional position may be measured inaccurately. Therefore, regarding the calculated three-dimensional position of the object, the distance measuring apparatus 1 re-projects the position at which the three-dimensional position is cast on the road surface on the captured image, and calculates the apparent image position. Next, the apparent image position and the actual object position are compared. When the actual object lower end does not exist in the vicinity of the apparent image position as a result of the comparison, the distance measuring apparatus 1 regards the target object as a moving object for which it is impossible to calculate the three-dimensional position accurately, and does not output the result. On the other hand, when it is determined that the actual object lower end exists in the vicinity of the apparent image position, the target object is regarded as accurate, and the result is output.

In the determination as to whether or not the object lower-end exists in the vicinity of the apparent image position, the distance measuring apparatus 1 projects the calculated three-dimensional position on the road surface, sets two separate points by a prescribed distance oppositely to each other in the direction that is perpendicular to the road surface, and sets the search range for each object based on the points at which the two points are re-projected on the image. When it is determined that the number of all the feature points detected in the search range is of a certain ratio or above with respect to the feature points regarded as those of the target object, the object is determined as the position output target.

As described above, by the distance measuring apparatus 1 according to the present embodiment, the three-dimensional position of an object existing in the surroundings may be measured using the motion stereo method by a monocular camera. At this time, when a moving object for which the epipolar constraint is not established is the target object, the feature point does not exist on the epipolar line, and the matching by the feature point matching unit 5 does not occur. Furthermore, by the distance measuring apparatus 1, it is possible to identify a moving body that is subject to the epipolar constraint in a special case. Therefore, it becomes possible to prevent the calculation of a wrong distance of an object in the surroundings due to a wrong detection of a moving object as a stationary object. Furthermore, when assisting parking, a wrong assistance may be prevented.

Variation Example

Figure 35:
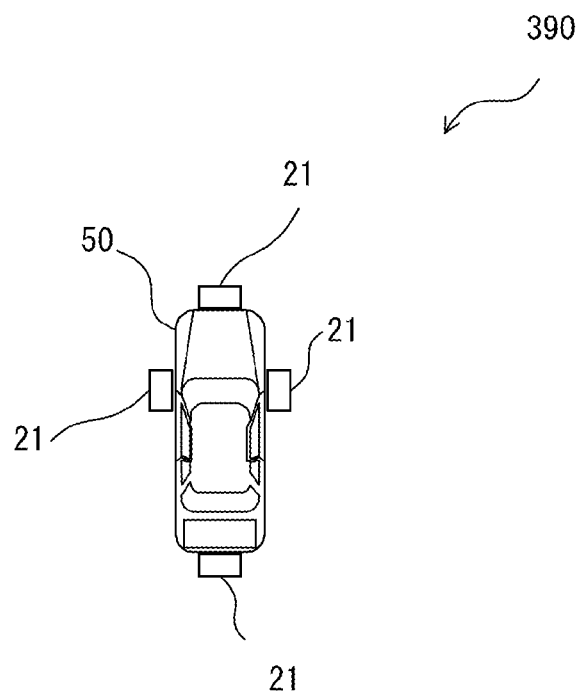
FIG. 35 is a diagram illustrating a configuration example of a parking assistance system by a variation example.

As a variation example of the distance measuring apparatus 1 an example of application to a car-mount image processing system in which the three-dimensional distance to a stationary object existing in the surroundings is measured by the distance measuring apparatus 1 according to the embodiment described above, and the result is displayed may be considered. As an example, a parking assistance system 390 is illustrated in FIG. 35. As illustrated in FIG. 35, the parking assistance system 390 in which four wide-angle cameras are attached to the front, rear, left, right of a vehicle, and a video in which video images of the four cameras are composited in one video image, and the surface shape of object in the surroundings (including parked vehicles) obtained by the three-dimensional distance measurement by the left and right cameras are displayed in an overlapped manner may be considered. By the parking assistance system 390 described above, the sense of distance in the surroundings may be supported. As the hardware configuration, a form in which, in the distance measuring apparatus 1, four units of the camera 21 are attached to the front, rear, left, right of the vehicle 50 may be considered.

At the time of parking, it is preferable to check the surroundings of the vehicle so as not to collide with surrounding objects. Therefore, the parking assistance system 360 according to this variation example composites four video images and converts it into an picture viewed from directly above (bird's-eye view video image) of the vehicle, so that the situation in the entire surroundings of 360 degrees may be understood. Accordingly, the surroundings may be checked from the video image. At this time, since the bird's-eye view video image is generated by image conversion and composition of the video images of four cameras on a two-dimensional plane, objects (vehicles) in the surroundings of the vehicle are stretched. As a result, it becomes difficult to visually understand the shapes and positional relationship of other vehicles existing in the surrounding. Therefore, by the distance measuring method described above by the left and right cameras, the three-dimensional position to the object feature point may be calculated, and the object surface shape may be generated from the result and may be overlapped and displayed on the composite image.

By the parking assistance system according to the present variation example, the sense of distance and possibility of colliding may be understood easily by checking the video image, and a driver who is not good at the parking operation may also park easily with peace of mind.

Meanwhile, in the embodiment and variation example described above, the distance measuring apparatus 1, and the parking assistance system 360 are an example of the distance measuring apparatus, the camera 21 is an example of the image capturing apparatus, and the vehicle speed sensor 23, the steering angle sensor 24 are an example of the amount of movement detecting apparatus.

Meanwhile, the present invention is not limited to the embodiment and the variation example described above, and may take various configurations or embodiments without departing from the scope of the present invention. For example, in the embodiment described above, the registration list 156 of only the immediately preceding frame in the past is registered in the feature point DB 17, but in order to increase the matching accuracy of the feature point, the registration lists 156 corresponding to the feature points of a plurality of past frames may be held in the feature point DB 17.

In the present embodiment, the registration timing of the edge list 154 into the feature point DB 17 is immediately after the feature point matching process, but as long as it is after the feature point matching process, any timing is fine. Other than that, the order of the processes explained in each flowchart is not limited to it. Furthermore, when re-projecting the projection point of the object on the road surface 54, either of the current frame and the preceding frame is fine.

Meanwhile, for the content rate, the number of feature points is calculated regardless of the success/failure of the feature point matching in the embodiment described above, but in order to increase the judgment accuracy of the moving object, the content rate may be calculated only for the feature point for which the matching with the feature point of the preceding frame has been successful. The output may be by a method to present the three-dimensional position on the image, a method of calculating the distance from the position of the camera for example, and to issue an alarm when it becomes equal to or smaller than a prescribed distance.

In the embodiment described above, as an example of a moving object that is subject to the epipolar constraint, a moving object that moves in a direction parallel to the vehicle 50 is described as an example, but in distance measuring method according to the embodiment or the variation example described above, other three dimensional positions that are calculated wrongly may also be eliminated.

Figure 36:
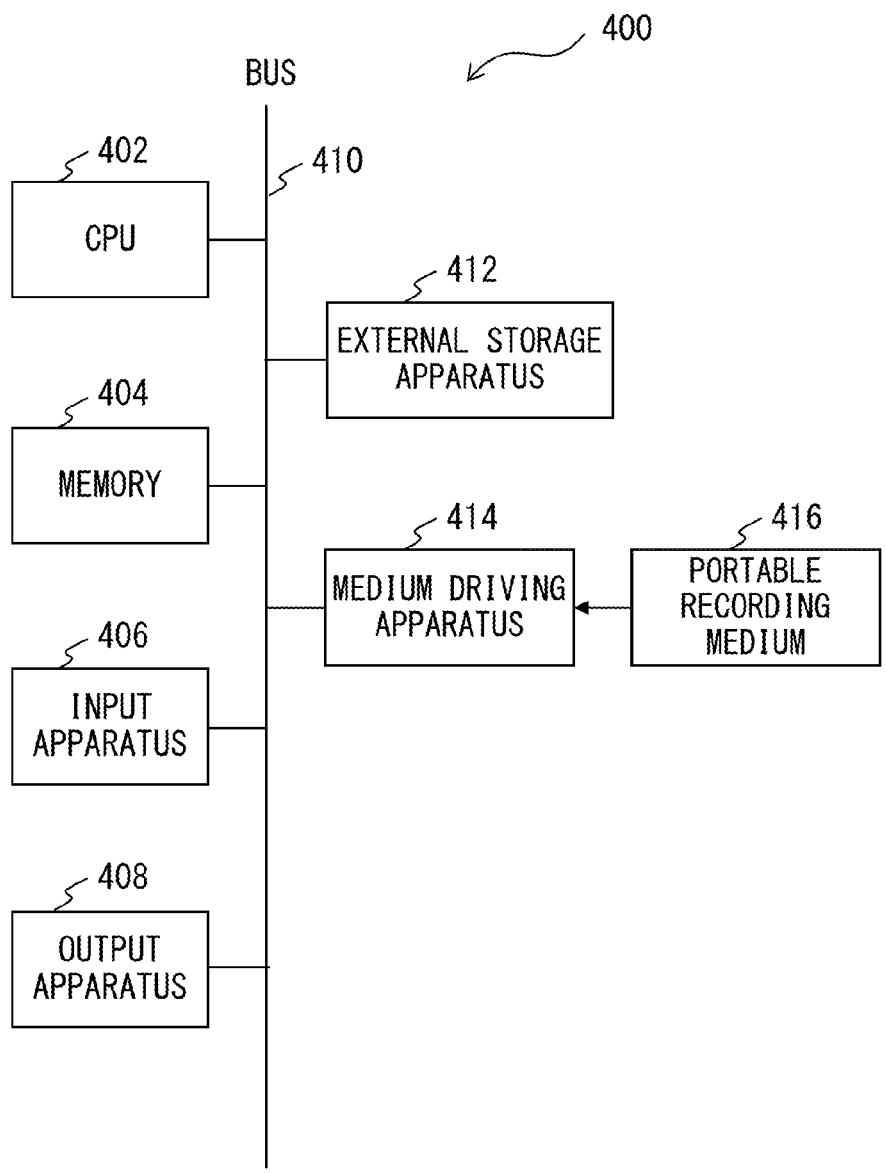
FIG. 36 is a block diagram illustrating an example of the hardware configuration of a standard computer.

Here, an example of a computer applied to make the computer execute the operations of the distance measuring method according to the embodiment and the variation example described above in common is explained. FIG. 36 is a block diagram illustrating an example of the hardware configuration of a standard computer. As illustrated in FIG. 36, in a computer 400, a Central Processing Unit (CPU) 402, a memory 404, an input apparatus 406, an output apparatus 408, an external storage apparatus 412, a medium driving apparatus 414, a network connection apparatus and the like are connected through a bus 410.

The CPU 402 is an operation processing apparatus that controls the operations of the entirety of the computer 400. The memory 404 is a storing unit for storing a program to control the operations of the computer 400 in advance and to be used as a work area as needed when executing a program. The memory 404 is, for example, a Random Access Memory (RAM), a Read Only Memory (ROM) and the like. The input apparatus 406 is an apparatus that obtains, when operated by the user of the computer, the input of various information from the user associated with the operation detail, and sends the obtained input information to the CPU 402, which is, for example, a keyboard apparatus, a mouse apparatus and the like. The output apparatus 408 is an apparatus that outputs the processing result by the computer 400, and includes a display apparatus and the like. For example, the display displays texts and images according to display data sent by the CPU 402.

The external storage apparatus 412 is a storage apparatus such as a hard disc and the like, which is an apparatus to store various control programs executed by the CPU 402, obtained data and the like. The medium driving apparatus 414 is an apparatus for performing write-in and read-out to/from a portable recording medium 416. The CPU 402 may made to perform various control processes by reading out and executing a prescribed control program recorded in the portable recording medium 416 via the recording medium driving apparatus 414. The portable recording medium 416 is, for example, a Compact Disc (CD)-ROM, a Digital Versatile Disc (DVD), a Universal Serial Bus (USB) memory and the like. The network connection apparatus 418 is an interface apparatus that controls wired or wireless data transmission/reception of various data with the outside. The bus 410 is a communication path that connects the respective apparatuses described above with each other, and performs data exchange.

The program to make the computer execute the distance measuring method according the embodiment and the variation example described above is stored in the external storage apparatus 412 for example. The CPU 402 reads out the program from the external storage apparatus 412, and makes the computer 400 perform the operation of the distance measurement. At this time, first, a control program for making the CPU 402 execute the process of the distance measurement is created and stored in the external storage apparatus 412. Then, a prescribed instruction is given from the input apparatus 406 to the CPU 402, to make it read out and execute the control program from the external storage apparatus 412. In addition, this program may also be stored in the portable recording medium 416.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A distance measuring apparatus placed in a vehicle, the distance measuring apparatus comprising: a processor configured to receive a first image captured by an image capturing apparatus placed in the vehicle when a position of the vehicle is a first position, a second image captured when the position of the vehicle is a second position that is different from the first position, and an amount of movement of the vehicle between the first position and the second position from an amount of movement detecting apparatus placed in the vehicle, to calculate a three-dimensional position of an object in surroundings of the vehicle based on the first image, the second image and the amount of movement, to determine that the calculated three-dimensional position is an error when a displacement between a fourth position at which a third position set based on the calculated three-dimensional position of the object is projected on either one image of the first image and the second image and a position of the object in the one image is equal to or larger than a prescribed value, to make the calculated three-dimensional position a distance measurement target when the calculated three-dimensional position is not determined as an error, to exclude the calculated three-dimensional position from the distance measurement target when the calculated three-dimensional position is determined as an error, and to output the three-dimensional position of the distance measurement target.

2. The distance measuring apparatus according to claim 1, wherein: the processor further extracts a feature point of each of the first image and the second image; matches feature points determined as displayed in common in the first image and the second image from extracted feature points; calculates a three-dimensional position corresponding to the matched feature point based on the matched feature point and the amount of movement; detects an object by regarding feature points whose three-dimensional positions are within a prescribed distance from each other as feature points associated with an identical object; projects the three-dimensional positions of the feature points associated with the identical object on the three-dimensional positions on a plane corresponding to a road surface on which the vehicle travels; projects the two third positions respectively away by a prescribed distance with respect to the projected three-dimensional positions on the plane in a top and bottom directions of the vehicle on the one image; and determines the three-dimensional position as an error when a displacement between the two fourth positions on which the two third positions are projected and the position of the object on the one image is equal to or larger than a prescribed value.

3. The distance measuring apparatus according to claim 2, wherein: the processor further decides a search range based on the projected two fourth positions; and determines the calculated three-dimensional position as an error when it is determined that a lower end of the identical object does not exist in the search range based on a relationship of a position of the feature points associated with the identical object on the one image and a position of the search range.

4. The distance measuring apparatus according to claim 3, wherein: the processor further determines the calculated three-dimensional position as an error, when a ratio of a number of feature points extracted in the search range to a number of the feature points associated with the identical object is equal to or smaller than a prescribed value.

5. The distance measuring apparatus according to claim 1, wherein: the processor further receives images captured by at least four image capturing apparatuses placed in front, rear, left, right of the vehicle including the image capturing apparatus placed in either left or right of the vehicle; and outputs an image in which the received images are composited and the output result as pieces of information to be displayed simultaneously, to a display apparatus provided in the vehicle.

6. A distance measuring method comprising: receiving a first image captured by an image capturing apparatus placed in a vehicle when a position of the vehicle is a first position, a second image captured when the position of the vehicle is a second position that is different from the first position, and an amount of movement of the vehicle between the first position and the second position from an amount of movement detecting apparatus placed in the vehicle; calculating a three-dimensional position of an object in surroundings of the vehicle based on the first image, the second image and the amount of movement by a processor; determining that the calculated three-dimensional position is an error when a displacement between a fourth position at which a third position set based on the calculated three-dimensional position of the object is projected on either one image of the first image and the second image and a position of the object in the one image is equal to or larger than a prescribed value by the processor; making the calculated three-dimensional position a distance measurement target by the processor when the calculated three-dimensional position is not determined as an error; and excluding the calculated three-dimensional position from the distance measurement target by the processor when the calculated three-dimensional position is determined as an error by the processor.

7. The distance measuring method according to claim 6, further comprising: extracting a feature point of each of the first image and the second image; matching feature points determined as displayed in common in the first image and the second image from extracted feature points; calculating a three-dimensional position corresponding to the matched feature point based on the matched feature point and the amount of movement; detecting an object by regarding feature points whose three-dimensional positions are within a prescribed distance from each other as feature points associated with an identical object; projecting the three-dimensional positions of the feature points associated with the identical object on the three-dimensional positions on a plane corresponding to a road surface on which the vehicle travels; projecting the two third positions respectively away by a prescribed distance with respect to the projected three-dimensional positions on the plane in a top and bottom directions of the vehicle on the one image; and determining the three-dimensional position as an error when a displacement between the two fourth positions on which the two third positions are projected and the position of the object on the one image is equal to or larger than a prescribed value.

8. The distance measuring method according to claim 7, further comprising: deciding a search range based on the projected two fourth positions; and determining the calculated three-dimensional position as an error when it is determined that a lower end of the identical object does not exist in the search range based on a relationship of a position of the feature points associated with the identical object on the one image and a position of the search range.

9. The distance measuring method according to claim 8, further comprising: determining the calculated three-dimensional position as an error, when a ratio of a number of feature points extracted in the search range to a number of the feature points associated with the identical object is equal to or smaller than a prescribed value.

10. The distance measuring method according to claim 6, further comprising: receiving images captured by at least four image capturing apparatuses placed in front, rear, left, right of the vehicle including the image capturing apparatus placed in either left or right of the vehicle; and outputting an image in which the received images are composited and the output result as pieces of information to be displayed simultaneously, to a display apparatus provided in the vehicle.

11. A non-transitory computer-readable recording medium having stored therein a program for causing a computer to execute a process comprising: receiving a first image captured by an image capturing apparatus placed in a vehicle when a position of the vehicle is a first position, a second image captured when the position of the vehicle is a second position that is different from the first position, and an amount of movement of the vehicle between the first position and the second position from an amount of movement detecting apparatus placed in the vehicle; calculating a three-dimensional position of an object in surroundings of the vehicle based on the first image, the second image and the amount of movement; determining that the calculated three-dimensional position is an error when a displacement between a fourth position at which a third position set based on the calculated three-dimensional position of the object is projected on either one image of the first image and the second image and a position of the object in the one image is equal to or larger than a prescribed value; making the calculated three-dimensional position a distance measurement target by the processor when the calculated three-dimensional position is not determined as an error; and excluding the calculated three-dimensional position from the distance measurement target by the processor when the calculated three-dimensional position is determined as an error.

12. The non-transitory computer-readable recording medium according to claim 11, the process further comprising: extracting a feature point of each of the first image and the second image; matching feature points determined as displayed in common in the first image and the second image from extracted feature points; calculating a three-dimensional position corresponding to the matched feature point based on the matched feature point and the amount of movement; detecting an object by regarding feature points whose three-dimensional positions are within a prescribed distance from each other as feature points associated with an identical object; projecting the three-dimensional positions of the feature points associated with the identical object on the three-dimensional positions on a plane corresponding to a road surface on which the vehicle travels; projecting the two third positions respectively away by a prescribed distance with respect to the projected three-dimensional positions on the plane in a top and bottom directions of the vehicle on the one image; and determining the three-dimensional position as an error when a displacement between the two fourth positions on which the two third positions are projected and the position of the object on the one image is equal to or larger than a prescribed value.

13. The non-transitory computer-readable recording medium according to claim 12, the process further comprising: deciding a search range based on the projected two fourth positions; and determining the calculated three-dimensional position as an error when it is determined that a lower end of the identical object does not exist in the search range based on a relationship of a position of the feature points associated with the identical object on the one image and a position of the search range.

14. The non-transitory computer-readable recording medium according to claim 13, the process further comprising: determining the calculated three-dimensional position as an error, when a ratio of a number of feature points extracted in the search range to a number of the feature points associated with the identical object is equal to or smaller than a prescribed value.

15. The non-transitory computer-readable recording medium according to claim 11, the process further comprising: receiving images captured by at least four image capturing apparatuses placed in front, rear, left, right of the vehicle including the image capturing apparatus placed in either left or right of the vehicle; and outputting an image in which the received images are composited and the output result as pieces of information to be displayed simultaneously, to a display apparatus provided in the vehicle.

* * * * *